United States Patent
Ye

(10) Patent No.: US 8,022,928 B2
(45) Date of Patent: Sep. 20, 2011

(54) FREE-SPACE POINTING AND HANDWRITING

(76) Inventor: Qinzhong Ye, Norrköping (SE)

( * ) Notice: Subject to any disclaimer, the term of this patent is extended or adjusted under 35 U.S.C. 154(b) by 976 days.

(21) Appl. No.: 11/920,419

(22) PCT Filed: Aug. 22, 2005

(86) PCT No.: PCT/SE2005/001232
§ 371 (c)(1),
(2), (4) Date: Nov. 15, 2007

(87) PCT Pub. No.: WO2007/024163
PCT Pub. Date: Mar. 1, 2007

(65) Prior Publication Data
US 2009/0027335 A1    Jan. 29, 2009

(51) Int. Cl.
*G09G 5/08* (2006.01)
(52) U.S. Cl. .................................. 345/158; 250/266
(58) Field of Classification Search .......... 345/158; 250/266
See application file for complete search history.

(56) References Cited

U.S. PATENT DOCUMENTS

| 3,951,550 A | 4/1976 | Slick |
| 4,794,245 A * | 12/1988 | Auer .......................... 250/206.2 |
| 6,628,964 B1 * | 9/2003 | Bates et al. ................. 455/556.1 |
| 7,501,613 B2 * | 3/2009 | Fergason ........................ 250/216 |
| 7,532,199 B2 * | 5/2009 | Kubo et al. .................... 345/161 |
| 7,623,115 B2 * | 11/2009 | Marks ............................ 345/156 |

FOREIGN PATENT DOCUMENTS
JP    2002-116876 A    4/2002
JP    2004-110293 A    4/2004
* cited by examiner

*Primary Examiner* — Richard Hjerpe
*Assistant Examiner* — Sahlu Okebato
(74) *Attorney, Agent, or Firm* — Birch, Stewart, Kolasch & Birch, LLP

(57) ABSTRACT

A position detection method using one or more one-dimensional image sensors for detecting a light source (22) in free space is adapted for use as a portable free-space data input device (20) for controlling of a cursor (42) on the display (44) of a computer. A user of the portable free-space data input device (20) should move the portable free-space data input device (20) in free space to control the movement of the cursor on the display. This portable free-space data input device (20) can also be used as a free-space handwriting device. It is possible to adapt this pointing device in a design of a user-friendly remote control for a multimedia home entertainment system.

38 Claims, 10 Drawing Sheets

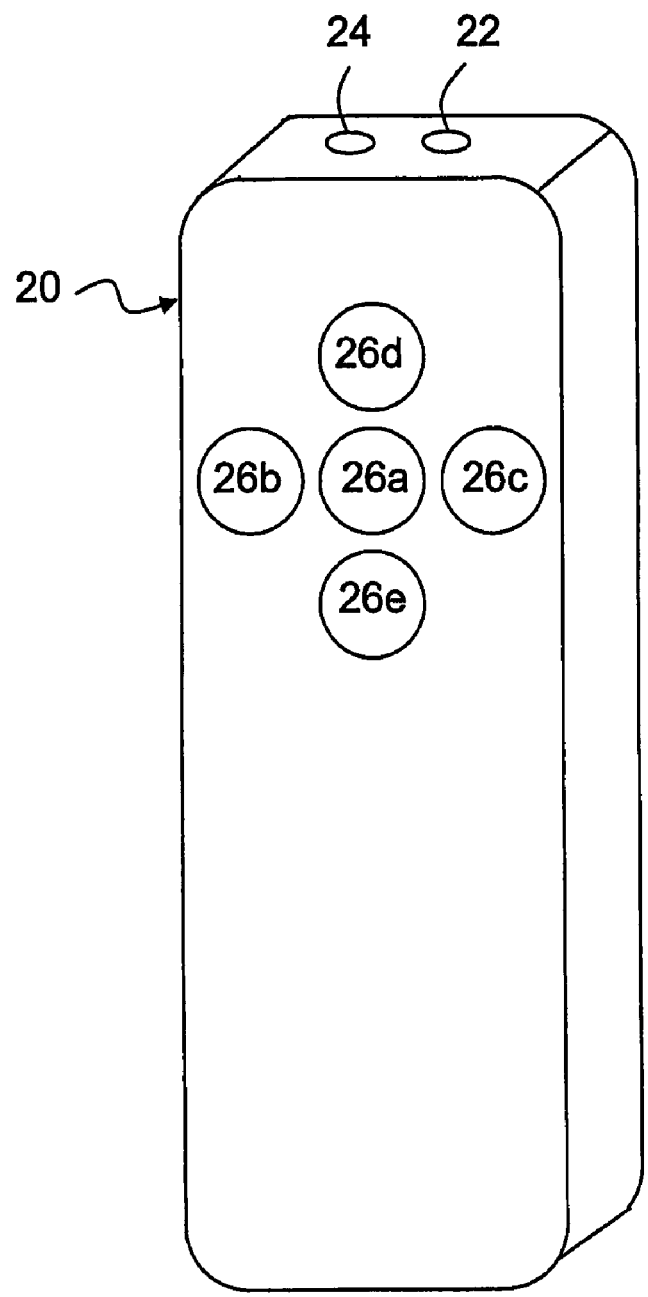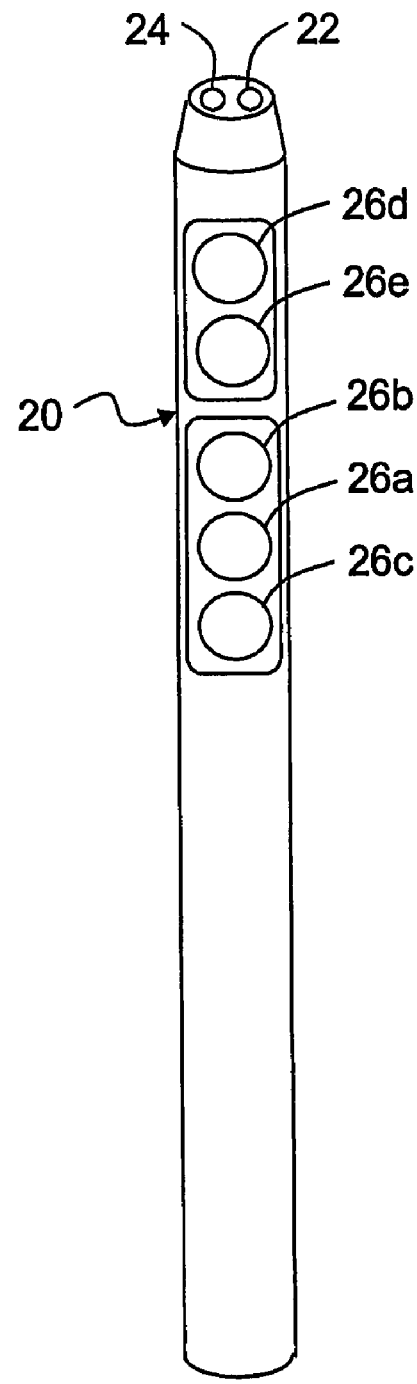
FIG. 3a
FIG. 3b

FREE-SPACE POINTING AND HANDWRITING

TECHNICAL FIELD

This invention relates to pointing and handwriting devices commonly used as input devices for computers, such as mice, trackballs, touchpads, joysticks and pen tablets. More particularly, it relates to a method of determining the position of a portable free-space data input device, a method of enabling an optical position detecting device to determine the position of a portable free-space data input device, a portable free-space data input device, an optical position detection device as well as system comprising such a portable free-space data input device and optical position detection device.

BACKGROUND ART

Various pointing devices have been used in computer systems to input the relative movement data. One most often used pointing device is computer mouse. A computer mouse can be moved by a user on a flat surface. A cursor displayed on the screen of a computer display follows the movement of the mouse and points on various items on the screen. While many people prefer using a mouse to other pointing devices, some people may suffer from pains in their fingers, hands, wrists, arms and shoulders after using a mouse for a long period of time. Alternative pointing devices such as trackballs, touchpads and joysticks can be used to reduce or avoid the use of mice for those people who suffer from the mouse-related pain.

The use of personal computers has been increased rapidly in recent years. Many people use computers at work for several hours per working day. At home, people use computers to access internet, read and write emails and play computer games. The new trend in the computer industry is to combine a computer with audio and video equipment and sources to provide a multimedia home entertainment system at home. Users of such a computer system can sit on their sofa and control the various functionalities, such as selecting TV channels, playing and recording video, playing and recording music, showing digital photos and accessing internet, by using a hand-held remote control. One desirable functionality of such a remote control is the functionality of controlling cursor movement. This means a pointing device should be designed and implemented on the remote control. At present, trackball, joystick and miniature gyroscope have been used to implement the pointing functionality on the remote controls for multimedia home entertainment systems. A pen tablet can be used as both a pointing device and a handwriting device. When a user is pointing with a cursor on the screen of a computer display, he/she pays attention to the eye-hand coordination. When a user uses handwriting to input letters or numbers into a computer, he/she pays more attention to the movements of the pen rather than to the eye-hand coordination. Handwriting input is also provided on many hand-held personal computers. A user can use a stylus to write letters and numbers on the screen of a hand-held personal computer. A handwriting recognition software is executed on the computer to recognize letters and numbers.

There is thus a need for a portable free-space data input device. However, in order to use such a device it is necessary to provide data to be processed from the device together with the possibility to track the position of the device.

In addition to the alternative pointing devices mentioned above, there is another market-available pointing device that uses a gyroscope to measure the angular changes of the user's hand. The designs of such a device are described in U.S. Pat. Nos. 5,440,326, 5,698,784, 5,825,350 and 5,898,421. The pointing device can be held in a user's hand and moved in free space. This provides an alternative is means for the user to reduce the use of the ordinary mouse and is recommended for the people who suffer from the mouse-related pain.

One problem to be solved in the design of a hand-held pointing device is how to let the user to use more natural hand and wrist movements to move the device in free space. The pointing device based on a gyroscope allows the user to move the device in free space. However, due to the use of a gyroscope as an angle detector, the user tends to use large angular wrist movements to make large or quick movements of the cursor on the screen. These large angular wrist movements deviate very much from the neutral position of the user's wrist. Therefore, the user may feel tired in his/her wrist if many large wrist movements are made for a long period of time. Since a gyroscope detects the angle movement of the user's hand, the pointing device cannot be used naturally as a free-space handwriting device, which requires the detection of the position of the user's hand in free space.

Another market-available pointing device, called SmartNav3™ marketed by NaturalPoint Inc., that can be used by the people who suffer from the mouse-related pain uses a two-dimensional imaging sensor to detect the movement of the head or hand of a user. The user can move his/her head or hand in free space to control the movement of the cursor. An infrared light source and an infrared camera are placed in front of the user. The user should put a small piece of reflective material on his/her head, glasses or cap or wear a ring with a small piece of reflective material. When the user moves his/her head or hand within the viewing angle of the camera, a sequence of two-dimensional images is captured by the camera. Each captured image is pre-processed by a special digital circuit to extract the high intensity area, which corresponds to the small piece of the reflective material. The pre-processed image is then sent to the personal computer via USB (Universal Serial Bus) port for further processing. The software on the computer detects the position of the high intensity area in the pre-processed image and converts the position changes to cursor movements. It is also possible to use a hand-held infrared light source and let the infrared camera directly capture the image of the light source.

Large angular wrist movements can be avoided when a pointing device based on a two-dimensional imaging sensor is used. The typical movement of the user's hand in free space is different from that of moving a pointing device based on a gyroscope. Since the user can move the three-dimensional position of the light source quickly by using his/her arm, the user does not need to make large angular wrist movements. Therefore, a to pointing device based on a two-dimensional imaging sensor is better than a pointing device based on a gyroscope from an ergonomic point of view.

At present, the above-mentioned market-available pointing device uses a two-dimensional imaging sensor of a limited resolution (i.e., a limited number of pixels) and thus has a rather limited angle of view. The infrared reflector or the infrared light source must be moved within the angles of view of the camera. If a user uses his/her head to control the cursor movement, the narrow angle of view can be accepted. But, if a user uses his/her hand to control the cursor movement, he/she may feel inconvenient if the angle of view is too narrow. The viewing angle of a camera cannot be simply increased by using a wide-angle lens. Due to the limited resolution of the two-dimensional imaging sensor, larger hand movement is required when the angle of view of the camera is increased. With a larger viewing angle, the required hand movement is further increased when the infrared light source is moved to a position more distant from the camera. A user may feel inconvenient to make a very large hand movement. Therefore, it is desirable to increase the number of pixels of the two-dimensional imaging sensor of the camera. However, the increased cost of a larger two-dimensional imaging sensor and the requirement on the increased throughput of the data processing hardware may result in a more expensive product.

Another potential problem of the market-available pointing device based a two-dimensional imaging sensor is that if there are more than one infrared light sources or reflective objects in the field of view of the camera, the image processing algorithm of the device may fail to detect the position of the intended infrared light source or the piece of reflective material worn by the user. This means that ambient light and any disturbing reflective material in the field of view of the camera should be controlled so that this problem can be avoided. If a pointing device based on an optical position detector should be designed, the problem of disturbing ambient light should be solved.

If a pointing device based an optical position detector should be used as a handwriting device in free space, a button must be available on the portable part of the device such that it can be operated by the moving hand of a user to activate handwriting. The market-available available pointing device based on a two-dimensional imaging sensor does not have any button on the portable part for activating handwriting. Using a button on a keyboard or a foot-operable switch for activating handwriting is not convenient.

It would therefore be advantageous to allow the use of a portable free-space data input device that does not require large angular wrist movements, while at the same time using an optical position detection technique that can be kept simple in its design.

There does exist an old technology for optical position detection of among other things a pilots head using one-dimensional imaging sensors and slits to detect the movement of a single point of light source. However it has never been used in combination with inputting data and is therefore not really close at hand to consider for use with data input devices. Since no input of data is used from the device having its position determined, the technology further has to use a light source that is constantly turned on.

This technology is for instance described in U.S. Pat. No. 4,092,072, where a single horizontally-mounted one-dimensional imaging sensor is used together with two mutually inclined slits arranged in a V-shaped configuration to detect the position of a light source. The sheets of light passing through the two slits impinge on the one-dimensional imaging sensor and result in two pulses in the captured one-dimensional image. The vertical position of the light source can be determined by measuring the distance between the two pulses. The horizontal position of the light source can be computed from the positions of the pulses relative to one end of the imaging sensor. Instead of using two V-shaped slits, it is also possible to use a mask with a triangular aperture or a mask with a triangular light obstructing member with two mutually inclined edges. The light passing through a mask with a triangular aperture impinges on the plane with the one-dimensional imaging sensor and forms a triangular pattern on the plane. Since the triangular pattern moves horizontally and vertically on the plane corresponding to the horizontal and vertical movements of the light source, the intersection of the pattern and the one-dimensional imaging sensor results in a pulse of varying positions and widths in the captured one-dimensional image. The horizontal position of the light source can be computed from the positions of the edges of the pulse relative to one end of the imaging sensor. The vertical position of the light source can be determined by measuring the distance between the two edges of the pulse. If a mask with a triangular light obstructing member with two mutually inclined edges is used, a pattern of a shadow formed by the triangular light obstructing member and the border of the mask is projected on the plane with the one-dimensional imaging sensor. The intersection of the pattern and the one-dimensional imaging sensor results in two wide pulses of varying positions and widths in the captured one-dimensional image. The horizontal and vertical positions of the light source can be computed from the positions of the two edges, which correspond to the mutually inclined edges of the mask, in the one-dimensional image.

In U.S. Pat. No. 4,209,254, a single one-dimensional imaging sensor is used. The two slits are arranged in perpendicular directions. The light passing through the two slits form two sheets of light. One sheet of light intersects the one-dimensional imaging sensor perpendicularly. The other sheet of light is rotated by a set of prisms so that this sheet of light also intersects the one-dimensional imaging sensor perpendicularly. The vertical and horizontal positions of the light source can be determined by measuring the positions of the two pulses detected in the captured one-dimensional image. Cylindrical lenses can be used in place of the slits to focus the light onto the one-dimensional imaging sensor.

A sensing device described by U.S. Pat. No. 3,951,550 can detect the direction of a single point source with the aid of two slits perpendicular to each other in a mask otherwise opaque to the emitted radiation. These slits are traversed by flat beams or sheets of incident rays lying in mutually orthogonal planes whose orientation can be detected with the aid of two elongated radiation detectors respectively intersected by these beams.

Even though different light limiting means such as masks with two slits arranged in a V-shaped configuration, a triangular aperture, a triangular light obstructing member with two mutually inclined edges and two orthogonally-oriented slits with or without a set of light-beam-rotating prisms is used in the designs of optical position/direction detecting devices in U.S. Pat. Nos. 4,092,072, 4,209,254 and 3,951,550, one common feature of these designs is that they use only one-dimensional sensors to detect two-dimensional positions/directions of a single point of light source. This optical position detection technique is feasible because the light from the single point of light source is limited by the light limiting means such that a two-dimensional pattern is projected onto the plane(s) where the sensing elements of one-dimensional sensors are located. For example, in the case of a triangular aperture, the triangular pattern is two-dimensional and in the case of two orthogonally-oriented slits, one part of the pattern is a horizontally-oriented narrow rectangle and the other part is a vertically-oriented narrow rectangle. A pattern should be produced by the light limiting means in such a way that when the single point of light source moves in free space, its position changes in at least two dimensions must result in two-dimensional changes of the pattern as well. One or two one-dimensional imaging sensors can be used to capture the two-dimensional pattern changes on the plane(s). Whether one or two one-dimensional imaging sensors should be used depends on the light limiting means and the produced pattern. The algorithms for two-dimensional position computation to be used depend on both the light limiting means and how the sensor(s) is arranged in relation to the light limiting means.

SUMMARY OF THE INVENTION

One object of the present invention is therefore directed towards solving the problem of allowing the use of a portable free-space data input device that does not require large angular wrist movements, while at the same time using an optical position detection technique that can be kept simple in its design and allows a limited consumption of power in the portable free-space data input device.

This object is according to a first aspect of the present invention achieved by a method of determining the position of a portable free-space data input device comprising the steps of:
receiving, in an optical position detecting device, a first set of pulses from the portable free-space data input device comprising at least one pulse including data to be processed,
receiving, in said optical position detecting device, a second set of pulses in the form of light pulses from the portable free-space data input device comprising at least one position indication pulse,
limiting a pulse of the second set of pulses to at least one first bundle of rays of light having a certain first cross-sectional shape,
projecting said at least one bundle onto a plane, where at least a first one-dimensional detector array is provided, for creating a pattern of light and dark areas in said plane,
detecting, in each detector array, a part of the pattern projected on it, and
determining the position of the portable free-space data input device in at least two dimensions based on junctions between light and dark areas of parts of the pattern detected by each detector array in order to allow the use of said position together with said input data.

This object is according to a second aspect of the present invention achieved by a method of enabling an optical position detecting device to determine the position of a portable free-space data input device comprising the steps of:
receiving, in the portable free-space data input device, data input by a user of the device,
transmitting a first set of pulses from the portable free-space data input device to the optical position detecting device comprising at least one pulse including said data to be processed, and
transmitting or reflecting a second set of pulses in the form of light pulses from the portable free-space data input device to the optical position detecting device comprising at least one position indication pulse,
in order to allow the optical position detecting device to determine, for use together with said input data, the position of the portable free-space data input device in at least two dimensions based on detecting junctions between light and dark areas of parts of a pattern of light and dark areas in at least a first one-dimensional detector array provided in a plane, where a pulse of the second set of pulses has been limited to at least one first bundle of rays of light having a certain first cross-sectional shape and projected onto said plane for creating said pattern.

The object is according to a third aspect of the present invention furthermore achieved by an optical position detecting device comprising
a data receiving unit arranged to receive a first set of pulses from a portable free-space data input device comprising at least one pulse including data to be processed,
a first limiting unit for receiving a second set of pulses in the form of light pulses, limiting a pulse of this second set to at least one first bundle of rays of light having a certain first cross-sectional shape and projecting said at least one bundle onto a plane for creating a pattern of light and dark areas in said plane,
at least a first one-dimensional detector array in said plane, where each detector array is arranged to detect a part of the pattern projected on it,
an image capturing unit controlling the operation of detector arrays, and
a pulse detecting unit arranged to determine the position of the portable free-space data input device in at least two dimensions based on junctions between light and dark areas of parts of the pattern detected by each detector array in order to allow the use of said position together with said input data.

The object is according to a fourth aspect of the present invention furthermore achieved by a portable free-space data input device comprising:
a user input unit arranged to receive data input by a user of the device,
means for transmitting a first set of pulses to an optical position detecting device comprising at least one pulse including said data to be processed, and
means for transmitting or reflecting a second set of pulses in the form of light pulses to the optical position detecting device comprising at least one position indication pulse, and
a transmission control unit receiving said input data from the user input unit and controlling at least said means for transmitting said first set of pulses,
in order to allow the optical position detecting device to determine, for use in combination with said input data, the position of the portable free-space data input device in at least two dimensions based on detecting junctions between light and dark areas of parts of a pattern of light and dark areas in at least a first one-dimensional detector array provided in a plane, where a pulse of the second set of pulses has been limited to at least one first bundle of rays of light having a certain first cross-sectional shape and projected onto said plane for creating said pattern.

The object is according to a fifth aspect of the present invention furthermore achieved by a system for determining the position of a portable free-space data input device comprising:
a portable free-space data input device having
a user input unit arranged to receive data input by a user of the device,
means for transmitting a first set of pulses comprising at least one pulse including said data to be processed, and
means for transmitting or reflecting a second set of pulses in the form of light pulses comprising at least one position indication pulse, and
a transmission control unit receiving said input data from the user input unit and controlling at least said means for transmitting said first set of pulses,
an optical position detecting device having
a data receiving unit arranged to receive said first set of pulses,
a first limiting unit for receiving said second set of pulses, limiting a pulse of this second set to at least one first bundle of rays of light having a certain first cross-sectional shape and projecting said at least one bundle onto a plane for creating a pattern of light and dark areas in said plane,
at least a first one-dimensional detector array in said plane, where each detector array is arranged to detect a part of the pattern projected on it,
an image capturing unit controlling the operation of detector arrays, and a pulse detecting unit arranged to determine the position of the portable free-space data input device in at least two dimensions based on junctions between light and dark areas of parts of the pattern detected by each detector array in order to allow the use of said position together with said input data.

In the present invention, one or more one-dimensional imaging sensors are used to detect the movement of a single point of light source, which is in contrast to the solution of the market-available pointing device using a two-dimensional imaging sensor. Thus the present invention provides or allows the provision of an ergonomically designed portable free-space data input device that does not require large angular wrist movements, while at the same time using an optical position detection technique that can be kept simple in its design and allows a limited consumption of power in the portable free-space data input device.

The portable free-space data input device may therefore be battery-driven. A user can hold the portable free-space data input device in his/her hand (or fasten it on his/her finger) and move it in free space to different positions. The user can activate various functionalities of the pointing device by pushing different buttons on the portable free-space data input device. For example, when this pointing device is used as computer input device, one of the functionalities of the device is to allow the user to control the movement of the cursor on the screen of a computer display by moving his/her hand in free space. One button on the portable free-space data input device can be used to activate this function. When the user pushes this button, a first set of pulses are transmitted from the portable free-space data input device to the data receiving unit of the optical position detecting device. Only then may the determination of the position be started.

The portable free-space data input device may be a pointing device as well as a handwriting device. When it is not convenient to use a keyboard to input text into a computer, for example, when a user is sitting on a sofa in front of a multimedia home entertainment system, it is possible to use a hand-held remote control, which is based on the present invention, to input text by handwriting in free space.

The present invention can be used as a three-dimensional input device for three-dimensional pointing and navigation.

BRIEF DESCRIPTION OF THE DRAWINGS

The present invention will be further described in relation to the enclosed drawings, where:

FIG. 3a shows a design of the housing unit of the portable free-space data input device with five buttons.

FIG. 3b shows a pen-shaped design of the housing unit of the portable free-space data input device.

FIG. 7 illustrates the ambient light removal technique.

DETAILED DESCRIPTION OF THE PREFERRED EMBODIMENT

Figure 1:
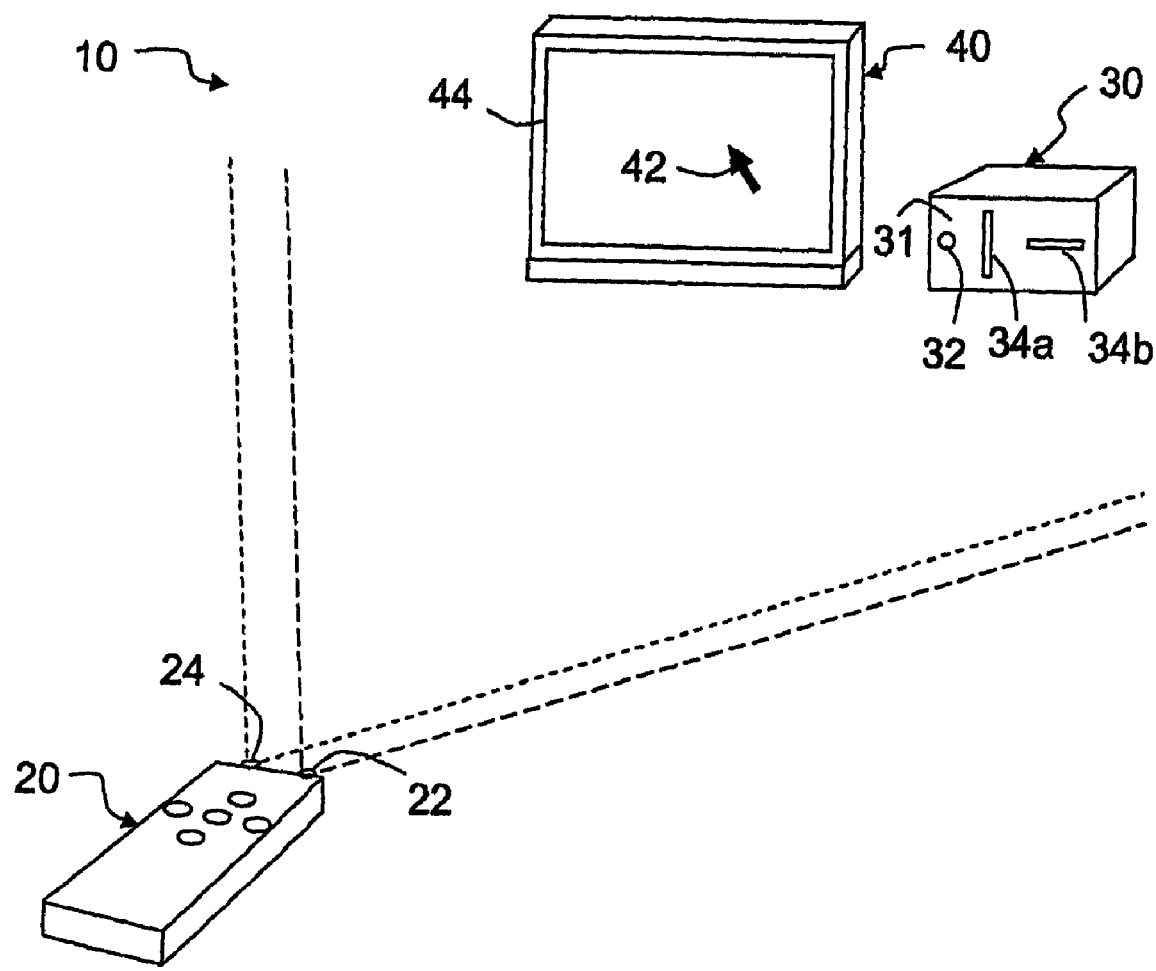
FIG. 1 is a perspective view of the pointing device and a display unit.

The perspective view of the preferred embodiment of the present invention is shown in FIG. 1. FIG. 1 describes a system 10 according to the present invention comprising a portable free-space data input device 20 being illustrated with a means for transmitting a first set of pulses, which is here an infrared emitting diode 24, and a means for transmitting or reflecting a second set of pulses, which is here a light emitting diode 22, where both means are mounted on one end of the portable free-space data input device 20. Both of light emitting diode 22 and infrared emitting diode 24 have a wide light emitting angle. The light emitting diode 22 transmits the second set of pulses and is the light source which should be detected by an optical position detecting device 30. Infrared emitting diode 24 transmits the first set of pulses and is used to implement a wireless command and synchronization signal transmitter. An optical position detecting device 30 is placed beside a display unit 40. On the front panel 31 of optical position detecting device 30, there are a data receiving unit, here provided as an infrared detector 32 which realizes a wireless command and synchronization signal receiver, a first limiting unit in the form of a first elongated opening, here in the form of a vertical slit 34a and a second limiting unit in the form of a second elongated opening, here in the form of a horizontal slit 34b. When the device 20 is moved by a user in free space, optical position detecting device 30 detects the movement of portable free-space data input device 20 and transmits the detected movement data to a computer system. Cursor 42 on screen 44 of display unit 40 of the computer system moves according to the received movement data.

Figure 2:
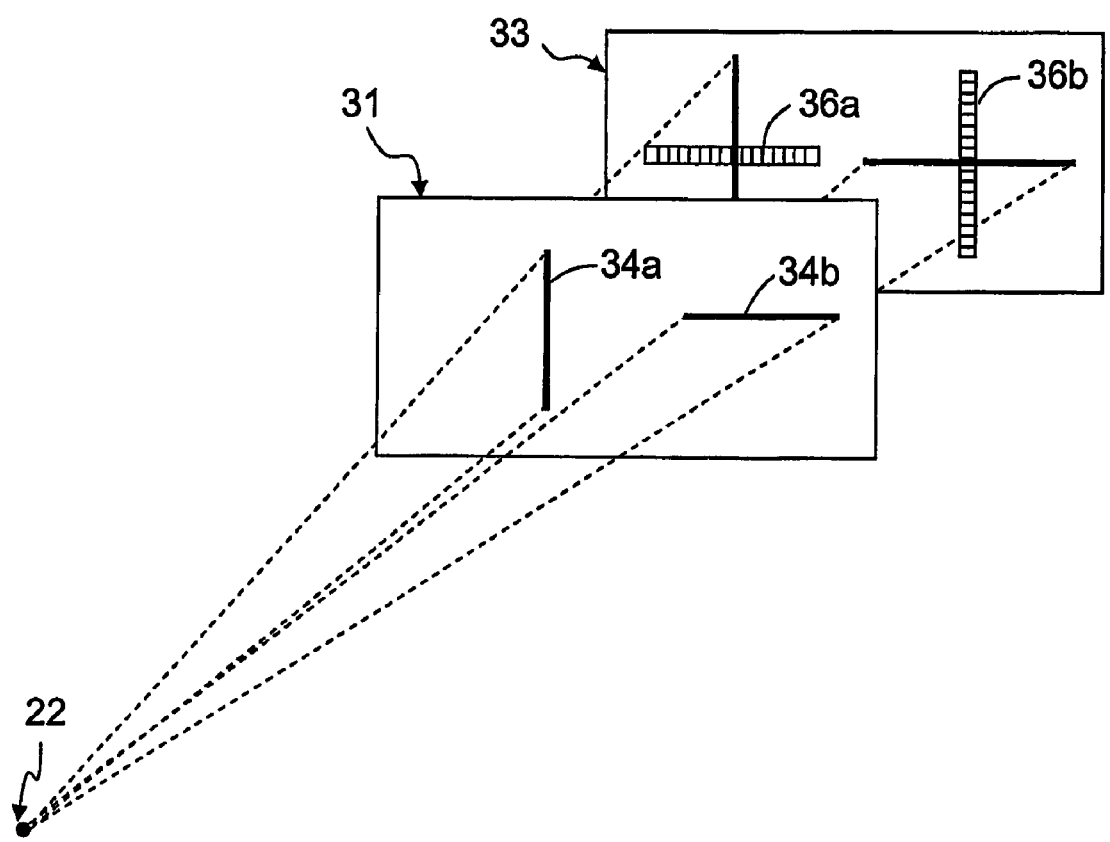
FIG. 2 is a perspective view of two slits and two one-dimensional imaging sensors.

FIG. 2 illustrates the principle of using a first one-dimensional detector array in the form of a first one-dimensional imaging sensor 36a and a second one-dimensional detector array in the form of a second one-dimensional imaging sensor 36b to detect the movement of light emitting diode 22. Slit 34a on front panel 31 of optical position detecting device 30 has a first essentially rectangular shape, which in essence provides limitation of the pulses of the second set of pulses to thin first bundles of rays of light having a first cross-sectional shape, which is here rectangular and close to one-dimensional, with a vertical orientation, i.e. the long sides of the rectangle are vertically oriented. The slit 34a is thus a vertically-oriented rectangular opening. The pulses in the second set of pulses from light emitting diode 22 passes through slit 34a and each gets limited to a second vertical sheet of light or to a bundle of rays of light having a first cross-sectional shape, which is here rectangular and close to one-dimensional, with a horizontal orientation, i.e. the long sides of the rectangle are horizontally oriented. The two sheets of light then gets projected on a plane 33 provided through the use of a circuit board and the two projected sheets of light provide a pattern in the plane made up of dark and light areas. Here the pattern is made up of one vertically oriented light thin rectangle and one horizontally oriented light, thin rectangle surrounded by a dark background. Each rectangle side thus provides a junction between a light and a dark area of the pattern. One-dimensional imaging sensor 36a is horizontally mounted on a printed circuit board such that the sensing elements of one-dimensional imaging sensor 36a is in the plane 33 at an angle to the projected first sheet of light, which angle is here perpendicular. This sheet of light thus intersects one-dimensional imaging sensor 36a. Therefore, slit 34a and one-dimensional imaging sensor 36a can detect horizontal movement of light emitting diode 22. Similarly, slit 34b is horizontal and one-dimensional imaging sensor 36b is vertical, and they can detect vertical movement of light emitting diode 22. This second sheet of light therefore intersects the detector 36b, which detector is provided at an angle, here perpendicular, to the projected second sheet of light. Each detector array thus detects a part of the pattern projected on it, where detector 36a detects the part of the pattern provided by slit 34a and detector 36b the part of the pattern provided by slit 34b. One-dimensional imaging sensors 36a and 36b are separated by a partition (not shown in FIG. 2) so that the sheet of light passing through slit 34a does not reach one-dimensional imaging sensor 36b and the sheet of light passing through slit 34b does not reach one-dimensional imaging sensor 36a. Another type of limiting unit is a cylindrical lens. Cylindrical lenses can be used to replace slits 34a and 34b and to focus the light on one-dimensional imaging sensors 36a and 36b. Optical filters can be used in front of slits 34a and 34b or cylindrical lenses to block the undesired frequency bands.

The detailed design of the housing unit of portable free-space data input device 20 is shown in FIG. 3a. Light emitting diode 22 and infrared emitting diode 24 are mounted on one end of portable free-space data input device 20. When portable free-space data input device 20 is held in a user's hand, the user's thumb can press any of the user input units that are here provided in the form of five buttons 26a, 26b, 26c, 26d and 26e on the top side of portable free-space data input device 20. The present invention can be used as a computer input device to replace a conventional computer mouse. When button 26a is pressed, the cursor on the computer screen follows the movement of portable free-space data input device 20. Buttons 26b and 26c are used to implement the functionalities of the left button and the right button of a computer mouse, respectively. When buttons 26b and 26c are quickly clicked or double-clicked, they perform left button and right button clicking or double-clicking of a computer mouse. When buttons 26b and 26c are pressed, the cursor follows movement of portable free-space data input device 20. This allows the user to use the present invention to perform marking, dragging and drawing operations of a computer mouse. Buttons 26d and 26e are used to perform scroll up and scroll down operations, respectively. When they are pressed, the cursor on the computer screen should not move.

When a user operates the buttons on portable free-space data input device 20 shown in FIG. 3a, he/she uses only his/her thumb. After a button is pressed, it must be released before the user begins to press another button. If two buttons are pressed simultaneously, portable free-space data input device 20 only responds to one of them depending on the actual hardware and/or software implementation. For ordinary users, this design is convenient because of the simple rule of thumb operation. For some other users, it is more important to be ready to click button 26b (left mouse button) or button 26c (right mouse button) as soon as the cursor is moved to a selected position. This requires that the cursor continuously moves on the screen of the display while button 26b or button 26c is clicked. This functionality can be achieved either by operating a button on the bottom side of portable free-space data input device 20 or by entering a move-continuously mode with a double-click of button 26a. The design shown in FIG. 3a can be modified by adding a button on the bottom side of portable free-space data input device 20. This button can be operated by the index finger of the user to activate cursor movement function. When this button is pressed, the cursor on the computer screen follows the movement of portable free-space data input device 20. When the cursor is moved to a selected position, the user can press or click button 26b or button 26c with his/her thumb immediately without releasing this index-finger-operated button. Instead of adding a new button, an alternative design can be achieved by simply moving button 26a to the bottom side of portable free-space data input device 20. Since button 26a is operated by the index finger now, the rule of operation should be modified to allow button 26a and any of buttons 26b and 26c to be pressed at the same time. The button on the bottom side of portable free-space data input device 20 should be preferably implemented with a touch sensitive switch. If no design change of the buttons is desirable, the move-continuously mode can also be entered by clicking button 26a twice quickly. This mode should be terminated when button 26a is pressed or clicked. In the case that none of buttons 26b and 26c is clicked for a certain period of time (e.g., 30 seconds), the move-continuously mode should also be terminated in order to save the power of the battery of portable free-space data input device 20.

An alternative design of the housing unit of portable free-space data input device 20 is shown in FIG. 3b. The shape of the housing unit of portable free-space data input device 20 can be designed as that of a pen. A user can hold portable free-space data input device 20 of this pen-shaped design as if he/she holds a pen for writing. The user can use his/her index finger or thumb to operate the buttons.

Figure 4:
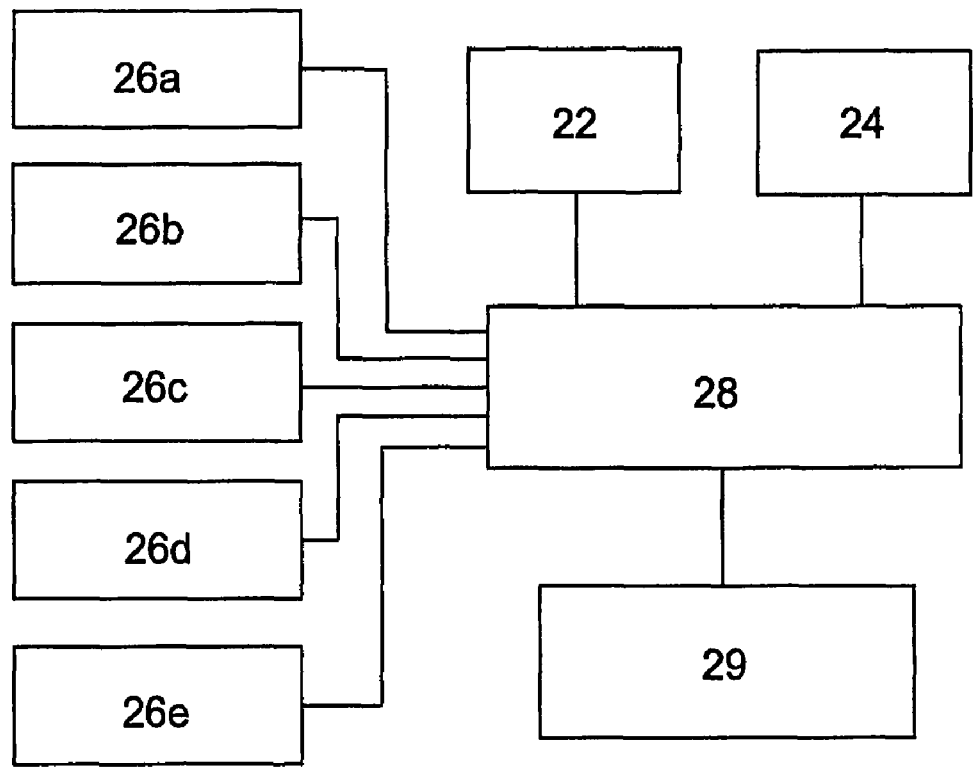
FIG. 4 is a block diagram of the portable free-space data input device.

The block diagram of portable free-space data input device 20 is shown in FIG. 4. A transmission control unit 28 can be realized either by a microprocessor or a specially-designed integrated circuit. The five buttons 26a, 26b, 26c, 26d and 26e are connected to input pins of transmission control unit 28. Light emitting diode 22 and infrared emitting diode 24 are connected to output pins of transmission control unit 28. Additional transistors (not shown in FIG. 4) for driving the required currents to light emitting diode 22 and infrared emitting diode 24 may be needed depending on the output current limits of transmission control unit 28. A battery 29 supplies power to transmission control unit 28. An additional switch or button (not shown in FIG. 4) for switching the power supply may be added to portable free-space data input device 20.

Figure 5:
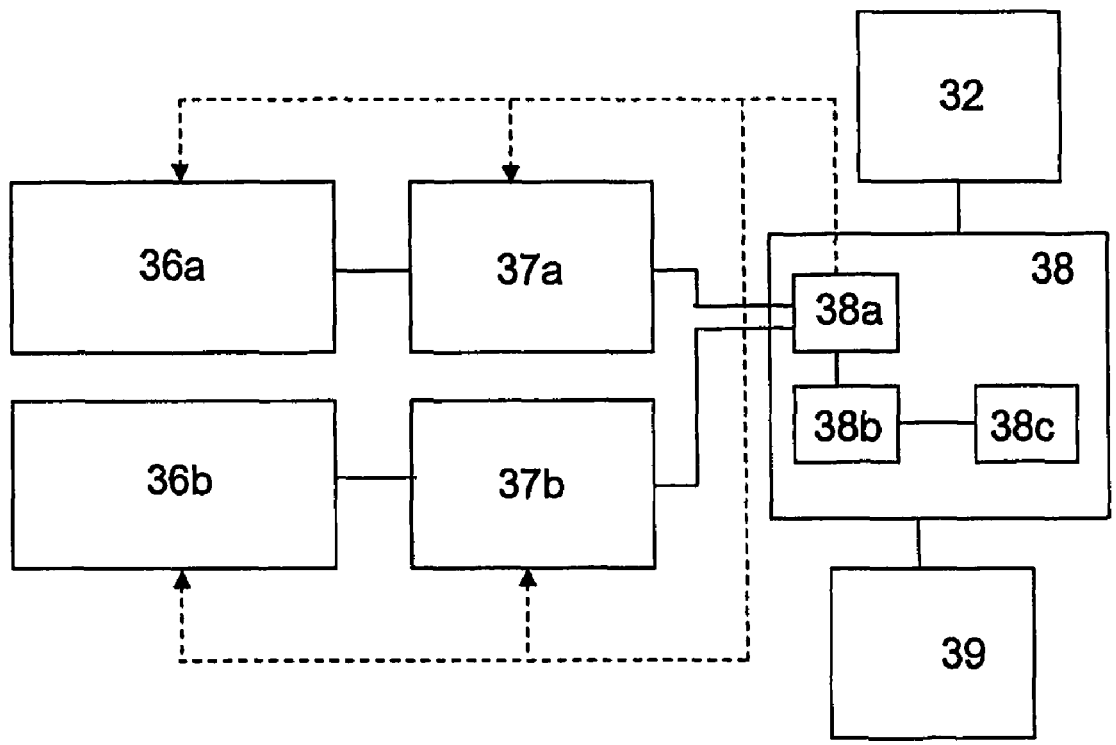
FIG. 5 is a block diagram of the optical position detecting device.

The block diagram of optical position detecting device 30 is shown in FIG. 5. A position determining unit 38 controls the operations of one-dimensional imaging sensors 36a and 36b, analog-to-digital (A/D) converters 37a and 37b, a data receiving unit in the form of an infrared detector 32 and an interfacing unit 39. The position determining unit comprises a image capturing unit 38a, an image processing unit 38b and a pulse detection unit 38c. One-dimensional imaging sensors 36a and 36b may be realized by either CCD (Charge Coupled Device) or CMOS (Complement Metal-Oxid Silicon) technique. The output signals of imaging sensors may be either analog signals or digital signals. If the output signals are analog signals, analog-to-digital (A/D) converters should be used to convert the analog signals to digital signals. FIG. 5 shows how analog-to-digital converters 37a and 37b are connected in case that the outputs of one-dimensional imaging sensors 36a and 36b are analog. If one-dimensional imaging sensors have built-in analog-to-digital converters, these sensors can be directly connected to the digital inputs of the position determining unit. If position determining unit 38 is implemented by a commercially-available digital signal processor with one or two built-in analog-to-digital converters, the analog output signals of the one-dimensional imaging sensors can be directly connected to the analog inputs of the digital signal processor.

In FIG. 1, FIG. 4 and FIG. 5, infrared emitting diode 24 and infrared detector 32 realizes the wireless command and synchronization signal transmitter and receiver, respectively. The commonly used technique of using 38 KHz modulated signal to drive infrared emitting diode 24 can be used to reduce the interference from other infrared sources, where said first set of pulses are transmitted. Infrared detector 32 on the optical detection unit 30 first performs demodulation on the received signal and then transmits the recovered binary signal to position determining unit 38.

Interfacing unit 39 in FIG. 5 is realized by an interfacing circuit and some software modules for Universal Serial Bus (USB). USB is commonly used to connect computers and their peripherals. A dedicated microprocessor with a USB interfacing circuit can be used to realize interfacing unit 39. If position determining unit 38 is implemented by a commercially-available digital signal processor, it is also possible to use a dedicated USB interfacing circuit to realized the hardware part and run the required software modules on the digital signal processor. Ideally, the most compact design can be achieved if the digital signal processor has a built-in USB interfacing circuit. USB may also provide the power supply to optical position detecting device 30. If the design of optical position detecting device does not use the power supply from USB cable, a power supply unit should be added to optical position detecting device 30.

Figure 6:
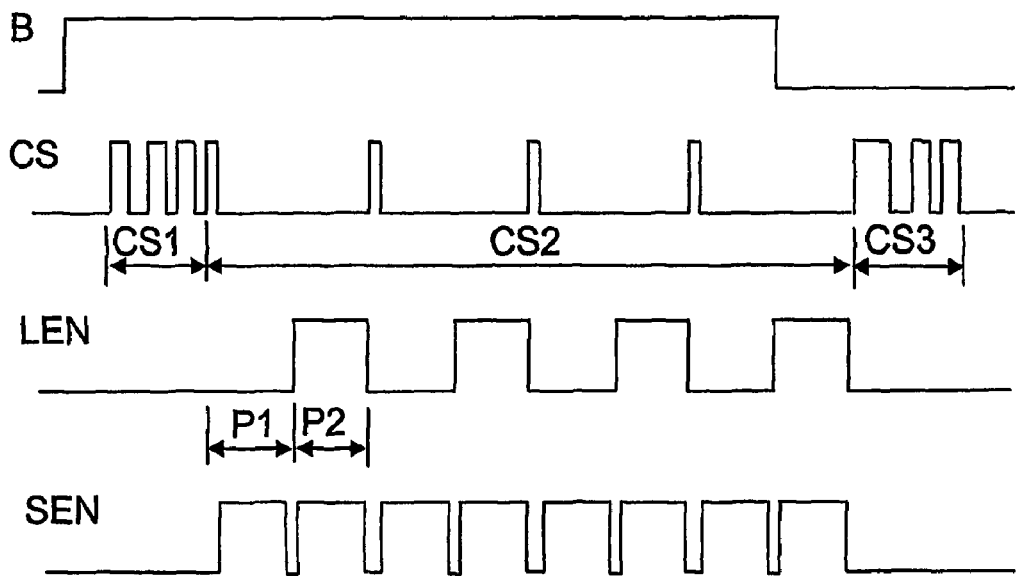
FIG. 6 shows the waveforms of input signal B, command and synchronization signal CS, LED enable signal LEN and sensor enable signal SEN.

FIG. 6 shows the waveforms of various signals. One example sequence of operations is explained in detail as follows. Suppose that button 26a of portable free-space data input device 20 is used to activate cursor movement when it is pressed. When button 26a is pressed, transmission control unit 28 detects the logic level change of the input signal B input by a user. Transmission control unit 28 then generates a first set of pulses, where at least one pulse includes data to be processed, which first set is in the form of a command and synchronization signal CS. A command for the ON status of button 26a is first generated as a sequence of bits in period CS1 as shown in FIG. 6. This first sequence thus includes data to be processed. Each bit of the command is modulated by the 38 KHz signal and sequentially transmitted via infrared emitting diode 24. Infrared detector 32 of optical position detecting device 30 demodulates the received signal and then transmits the recovered binary signal to position determining unit 38. In the command and synchronization signal CS, there is also provided a number of synchronization pulses. After interpreting the received command, position determining unit 38 should wait for the first synchronization pulse. After transmission of the command in period CS1, of transmission control unit 28 generates synchronization pulses in period CS2 as shown in FIG. 6. The 38 KHz modulated synchronization pulses are sent from portable free-space data input device 20 to optical position detecting device 30 regularly during the entire period when button 26a is pressed. These synchronization pulses are used to avoid the problem of accumulated clock errors between the clock sources of portable free-space data input device 20 and optical position detecting device 30, since any button of portable free-space data input device 20 may be pressed for a long period of time. How often these synchronization pulses should be sent depends on how accurate the clock sources are. FIG. 6 illustrates the case where the synchronization pulses are sent at beginning of every off/on period (e.g., 8 ms) of light emitting diode 22. Now, portable free-space data input device 20 sends the first modulated synchronization pulse via infrared emitting diode 24. When optical position detecting device 30 receives the synchronization pulse, each of one-dimensional imaging sensors 36a and 36b are activated by the image capturing unit 38a of position determining unit 38 and begins to capture an image during the LED-off period P1. The sensor enable signal SEN, as shown in FIG. 6, only indicates when one-dimensional imaging sensors 36a and 36b should begin to capture images. The actual sensor timing control signals should be generated based on the selected sensor for a design. After the LED-off period P1, light emitting diode 22 is turned on by the LED enable signal LEN on portable free-space data input device 20. Thus in a LED-on period a position indication pulse is generated by the light emitting diode 22, which pulse is used for determining the position of the portable free-space data input device. Each of one-dimensional imaging sensors 36a and 36b should capture another image during the LED-on period P2. They thus provide images that are stored in a memory under the control of the image capturing unit 38a. The images taken during LED-on period then shows the pattern projected on the plane. As can be seen in FIG. 6 several position indication pulses are generated as long as synchronization pulses are provided. These position indication pulses make up the second set of pulses. When button 26a is released, portable free-space data input device 20 terminates the transmission of synchronization signal, switches off light emitting diode 22 and sends a corresponding command in period CS3 via infrared emitting diode 24 to optical position detecting device 30. This command in period CS3 thus makes up at least one end pulse that indicates an end of data to be processed. In this way user inputs for providing data to be transmitted are processed for obtaining a first set of pulses including said data. The user inputs also triggers the generation and transmission of the second set of pulses.

The light emitting diode 22 and infrared emitting diode 24 are thus only activated by transmission control unit 28 for transmission of the first and second set of pulses when data is to be transmitted.

The ambient light removal technique is illustrated in FIG. 7. Since operations of one-dimensional imaging sensors 36a and 36b are synchronized with the switching of light emitting diode 22 as illustrated in FIG. 6, the captured images are ambient light images with light emitting diode 22 off and LED-illuminated images with light emitting diode 22 on, i.e. images comprising a position indication pulse that are stored by the image capturing unit 38a in a memory. FIG. 7a shows the intensity values (I) of the pixels in the ambient light image captured during LED-off period by a one-dimensional imaging sensor of 1024 pixels. FIG. 7b shows the intensity values (I) of the pixels in the LED-illuminated image captured during LED-on period by the same one-dimensional imaging sensor. From the memory the images can be forwarded to image processing unit 38b, where each pixel value of an ambient light image is subtracted from the corresponding pixel value of the LED-illuminated image captured with the same sensor. The resultant image is shown in FIG. 7c. The pixels (or pulse) corresponding to the LED illumination can be easily identified in the resultant image after the pixel-wise subtraction operation. The resultant image can be thresholded with a small threshold T1 to further remove some noises from reflected light, sensors and digitization process. The resultant image is shown in FIG. 7d.

Figure 7A:
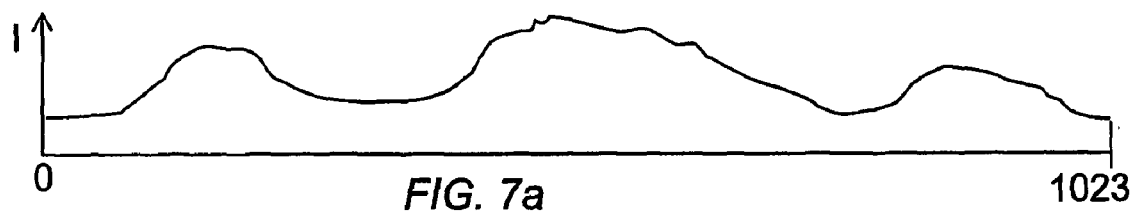
FIG. 7a shows the intensity values (I) of the pixels in the ambient light image captured during LED-off period by a one-dimensional imaging sensor of 1024 pixels.
Figure 7B:
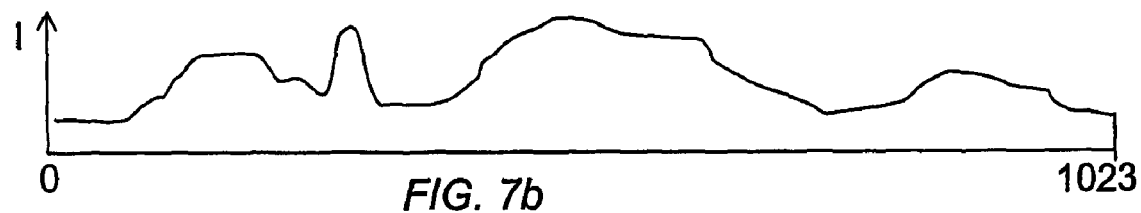
FIG. 7b shows the intensity values (I) of the pixels in the LED-illuminated image captured during LED-on period by the same one-dimensional imaging sensor.
Figure 7C:
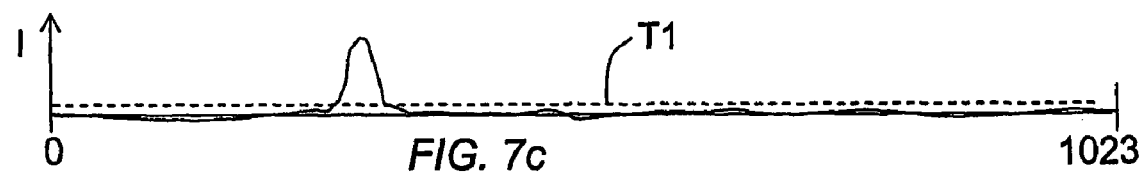
FIG. 7c shows the intensity values (I) of the pixels in the difference image between the images in FIG. 7a and FIG. 7b.
Figure 7D:
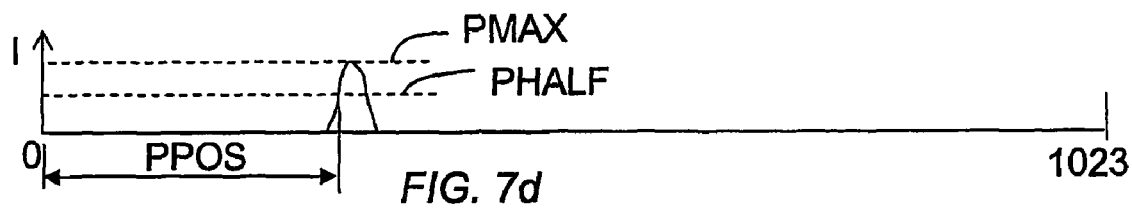
FIG. 7d shows the intensity values (I) of the pixels in the resultant image after thresholding the image in FIG. 7c.

After thresholding the process image can be provided to the pulse detection unit 38c, where the position of the pulse corresponding to the LED illumination can be computed with various methods. If the requirement on position resolution is not so high, a simple method of detecting a pixel on the slope of the left edge or right edge of the pulse can be used. Thus here the junction between a light and a dark area of the part of a projected shape that is detected by a detector is used for determining a position. As is illustrated in FIG. 7d, this pixel might be defined as the pixel which is on the left edge of the pulse and has a pixel value PHALF closest to 50% of the maximum pixel value PMAX of the pulse. The position of the pulse PPOS is defined as the index number of the pixel as shown in FIG. 7d. If the requirement on position resolution is high, some edge position detection methods with subpixel resolution should be used. Various digital filtering techniques can be also used to suppress noise in the captured images or any intermediate images. By using two such pulse positions in vertical and horizontal direction it is possible to identify the position of portable free-space data input device 20 in two dimensions.

If relative cursor movement is required, relative movement data should be sent to the host computer system. Position determining unit 38 should save each detected pulse position in its memory. When a new pulse position is detected, the previously saved pulse position is retrieved from the memory and subtracted from the new pulse position. The resultant relative pulse movement data is sent to the host computer system via the interfacing unit 39.

Each one-dimensional imaging sensor and its slit form a perspective view in front of optical position detecting device 30. Therefore, the amount of cursor movement on the display of the computer depends on both the amount of movement of portable free-space data input device 20 in free space and the distance between portable free-space data input device 20 and optical position detecting device 30. When portable free-space data input device 20 is close to optical position detecting device 30, a small movement of portable free-space data input device 20 in free space will result in a large movement on the display of the computer. If this effect of the perspective view is undesirable, it can be reduced by using the maximum pixel value PMAX of the pulse, as shown in FIG. 7d, to regulate the relative pulse movement data since the maximum pixel value PMAX of the pulse depends mainly on the distance between portable free-space data input device 20 and optical position detecting device 30. For example, when the maximum pixel value of the pulse is larger than a pre-determined threshold, the ratio of the threshold to the maximum pixel value of the pulse should be multiplied to the relative pulse movement data. Since the ratio is less than 1, the magnitude of the relative pulse movement data becomes smaller and the amount of cursor movement on the display of the computer becomes also smaller. In this way it is possible to also determine the position of portable free-space data input device 20 in a third dimension, such that its position in space can be determined.

Since the maximum pixel value of the pulse provide depth (range) information between portable free-space data input device 20 and optical position detecting device 30, it is possible to use the present invention as a three-dimensional input device for three-dimensional pointing and navigation. If a more precise three-dimensional position data is required, the present invention can be extended by adding one horizontally mounted one-dimensional imaging sensor to the right of one-dimensional imaging sensor 36b and one vertical slit to the right of slit 34b in FIG. 2. The position data of the pulses detected on the two horizontally-mounted one-dimensional imaging sensors (sensor 36a and the newly added sensor) can be used to compute depth (range) data by triangulation.

Some people may have difficulties to hold their hands steady when they move portable free-space data input device 20 in free space. It is preferred to reduce ratio of the amount of cursor movement to the amount of movement of portable free-space data input device 20 when the speed of movement of portable free-space data input device 20 is slow. This can be realized by multiplying a small scale factor to the detected amount of movement when the detected movement speed is lower than a pre-determined threshold. If a more delicate control is required, several different scale factors and thresholds can be used.

Since marking, dragging and drawing do not need a fast cursor movement typically, a small scale factors can also be multiplied to the detected amounts of movement when buttons 26b and 26c are pressed. This can also reduce unintended cursor movement when buttons 26b and 26c are clicked or double-clicked.

Since buttons 26d and 26e are used for scroll up and scroll down operations, the cursor on the screen does not move when any of these buttons is pressed. Therefore, portable free-space data input device 20 does not turn on light emitting diode 22 and no synchronization signals are sent via infrared emitting diode 24. When button 26d or 26e is pressed, a corresponding command is sent repeatedly via infrared emitting diode 24. Optical position detecting device 30 counts the received commands and sends the count with a suitable polarity to the host computer via interfacing unit 39.

The present invention can also be used as a free-space handwriting device for entering letters, numbers or other symbols into a computer system. A user can use portable free-space data input device 20 to write a character in free space and the position data of the movements is sent to a computer and analyzed by a software for handwriting recognition. If the functionalities of a designed device include both the functionalities of a conventional computer mouse and the functionalities of handwriting device, a separate mode-control button should be added to portable free-space data input device 20 and used to control the modes of operations. For example, there may be one mode for mouse operations and another mode for handwriting, and each click of the mode-control button switches the present mode to the other mode. In the mode for mouse operations, button 26a is assigned to activate cursor movement, and in the mode for handwriting, it is assigned to activate handwriting, that is, when it is pressed, a special command is sent from portable free-space data input device 20 to optical position detecting device 30 and each movement of portable free-space data input device 20 is interpreted as a stroke of a character. For the software for handwriting recognition, it may be desirable to have absolute position data for the movement of each stroke. For example, with absolute position data, it is easy to determine whether each entered stroke is associated with a previous stroke or is the first stroke of a new character. All the sampled position data of a stroke may be coded as absolute position data. Alternatively, the data format for each stroke can begin with an absolute position data and be followed by a sequence of relative movement data. As an alternative design, it is also possible that a dedicated button for activating handwriting is added to portable free-space data input device 20, and a separate mode-control button is not needed in this case. If no dedicated button for mode control or activating handwriting should be added to portable free-space data input device 20, the mode control can still be achieved by a double-click (clicking twice quickly) of the button 26*a*. Notice that this way of using the double-click of button 26*a* is possible only if the double-click of button 26*a* is not used for entering the move-continuously mode.

In the preferred embodiment, position determining unit 38 is implemented by a commercially-available digital signal processor. Digital images are saved in the memory of the digital signal processor and then processed by the digital signal processor. It is possible to implement position determining unit 38 with other digital design techniques. For example, a dedicated digital processing circuit can be developed to perform all the data processing and control tasks.

Another possible embodiment is that position determining unit 38 transfers digital images directly to the host computer via an interfacing means, e.g., a USB port. This is possible due to the fact that the present invention uses one-dimensional imaging sensors. Either the captured images or any intermediate processed images (e.g. the resultant image after pixel-wise subtraction, the resultant image after thresholding, etc.) can be transferred to the host computer. A captured image or an intermediate image can be compressed or coded in a data format suitbale for data transmission via the interfacing means. The host computer processes the received images and detects the pulses in the images. The detected positions of the light source are used to control the cursor movement on the screen of the display of the host computer. This means that the optical position detecting device may be distributed. As an alternative the whole device may be provided in a computer. The functionalities (i.e., image capturing, image processing and pulse detection) of position determining unit 38 could here be separately realized in three sub-units: image capturing unit 38*a*, image processing unit 38*b* and pulse detection 38*c* as shown in FIG. 5. Image capturing unit 38*a* should generate all the control signals to the one-dimensional imaging sensors and analog-to-digital converters and save the captured images in a buffer memory for further processing or transferring the captured images to the host computer for further processing. Image processing unit 38*b* performs all digital image processing algorithms (e.g. pixel-wise subtraction). Pulse detection unit 38*c* performs pulse detection with possiblely various algorithms. Either pulse detection unit 38*c* or both pulse detection unit 38*c* and image processing unit 38*b* can be realized on the host computer while the rest of the sub-units of the position determining unit are realized on the optical position detecting device.

In the present invention, one-dimensional imaging sensors are used to detect the movement of a single point of light source, which is in contrast to the solution of the market-available pointing device using a two-dimensional imaging sensor. Thus the present invention provides or allows the provision of an ergonomically designed portable free-space data input device that does not require large angular wrist movements, while at the same time using an optical position detection technique that can be kept simple in its design and allows a limited consumption of power in the portable free-space data input device. The portable free-space data input device may therefore be battery-driven.

CCD (Charge Coupled Device) and CMOS (Complement Metal-Oxide Silicon) one-dimensional imaging sensors with a large number of pixels (>1000) are commercially available. The manufacturing cost for a CCD (or CMOS) one-dimensional imaging sensor with N pixels is much less than that for a CCD (or CMOS) two-dimensional imaging sensor of N×N pixels if N is large.

The data throughput required for processing the data from two one-dimensional imaging sensors of N pixels is also much less than the data throughput required for processing the data from one two-dimensional imaging sensor of N×N pixels. Therefore, the signal processing means of the present invention can be implemented as a simpler and also a cheaper signal processing device.

The ambient light removal technique, which removes the effect of disturbing ambient light, may be used for either a pointing device with one-dimensional imaging sensors or a pointing device with a two-dimensional imaging sensor. The ambient light removal technique requires that the number of frames per second is doubled and one or two frames of data from a sensor are stored in a memory unit for further processing. Due to the use of one-dimensional imaging sensors and one-dimensional data storage and processing on the present invention, the ambient light removal technique can be easily implemented. Even though the ambient light removal technique may be used for a pointing device with a two-dimensional imaging sensor, the increased number of imaging frames per second and the increased requirement on data processing and data storage would make it a more costly solution.

Several alternative designs of the housing unit of portable free-space data input device 20 are described as follows.

Figure 8A:
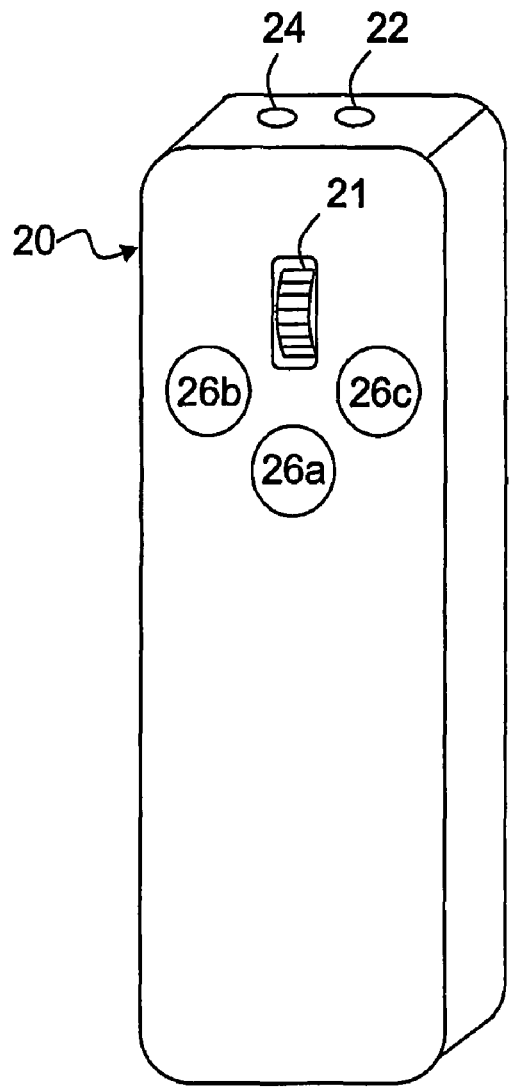
FIG. 8 shows two alternative designs of the housing unit of the portable free-space data input device with a wheel switch.
Figure 8B:
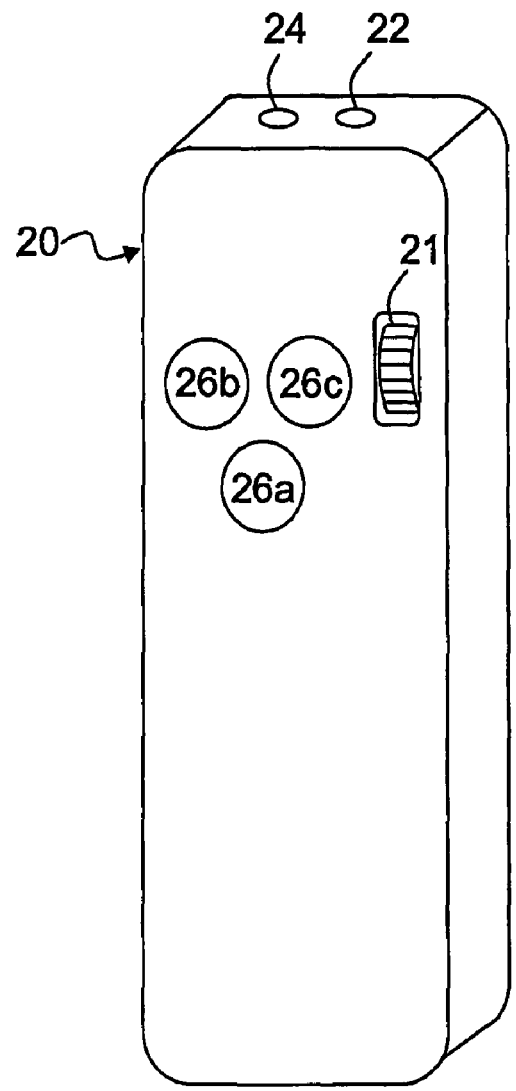

Two alternative designs of the housing unit of portable free-space data input device 20 with a wheel switch are shown in FIG. 8. Light emitting diode 22 and infrared emitting diode 24 are mounted on one end of portable free-space data input device 20. When portable free-space data input device 20 is hold in a user's hand, the user's thumb can press any of the three buttons 26*a*, 26*b* and 26*c* and operate a wheel switch 21. Similar to the design description for FIG. 3, when button 26*a* is pressed, the cursor on the computer screen follows the movement of portable free-space data input device 20. Buttons 26*b* and 26*c* are used to implement the functionalities of the left button and the right button of a computer mouse, respectively. Wheel switch 21 is used to perform scroll up and scroll down operations of a computer mouse. In the design shown in FIG. 8*b*, button 26*b* is close to button 26*c*. This arrangement may reduce the amount of movement of the user's thumb when both the left mouse button and the right mouse button need to be frequently clicked.

Figure 9A:
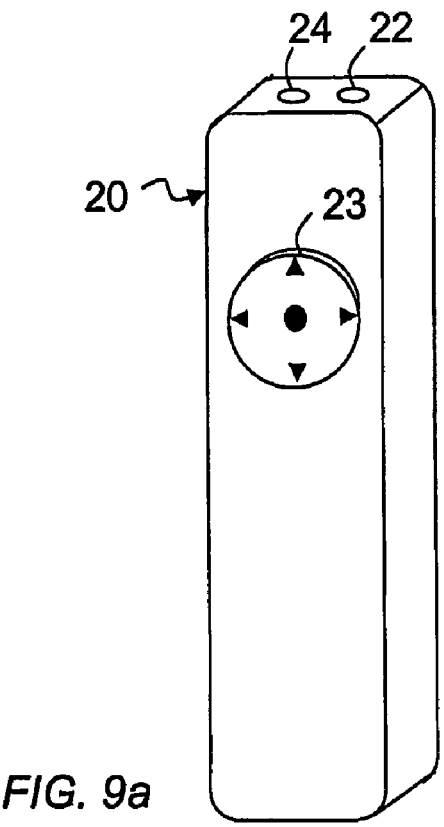
FIG. 9a shows a design of the housing unit of the portable free-space data input device with a multi-way switch.
Figure 9B:
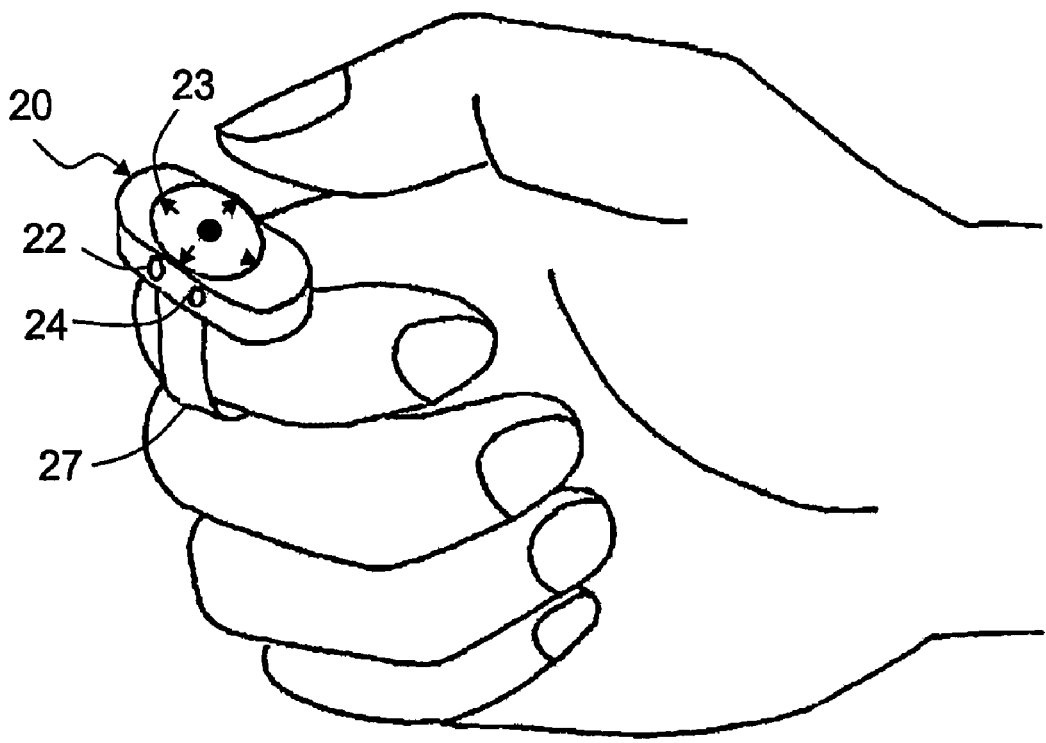
FIG. 9b shows a miniaturized design of the housing unit of the portable free-space data input device with a multi-way switch.

Two alternative designs of the housing unit of portable free-space data input device 20 with a multi-way switch are shown in FIG. 9. A multi-way switch 23 is used to replace the five buttons in the design shown in FIG. 3. The miniaturized design shown in FIG. 9*b* allows the user to use a fastening band 27 to fasten portable free-space data input device 20 on his/her index finger. With the present battery technologies, it is not difficult to find a suitable rechargeable battery for the design. If the housing unit of a miniaturized portable free-space data input device should be very small and thin, a separate battery unit (not shown in FIG. 9*b*) can be used to supply power to the device. This battery unit can be fastened on the wrist of a user and connected to the miniaturized portable free-space data input device via a short cable.

Figure 10A:
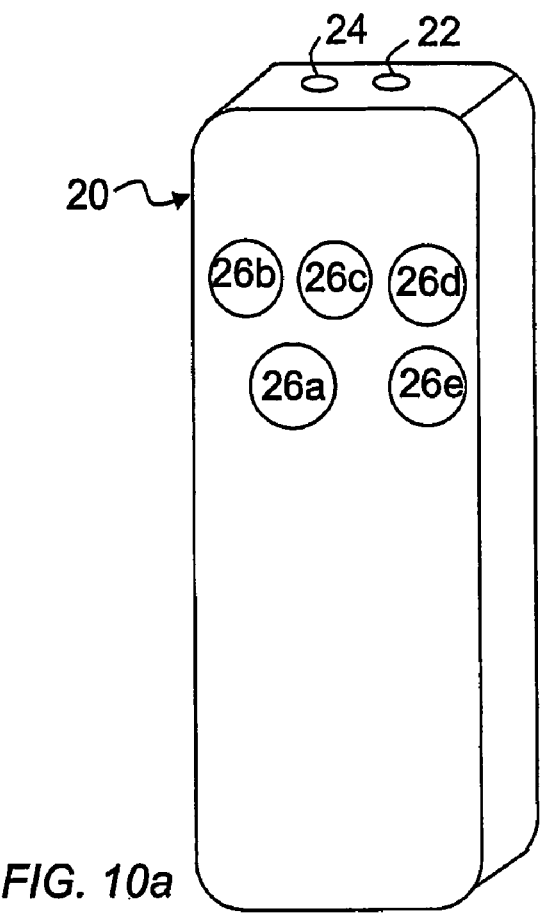
FIG. 10a shows a design of the housing unit of the portable free-space data input device with a different button arrangement.
Figure 10B:
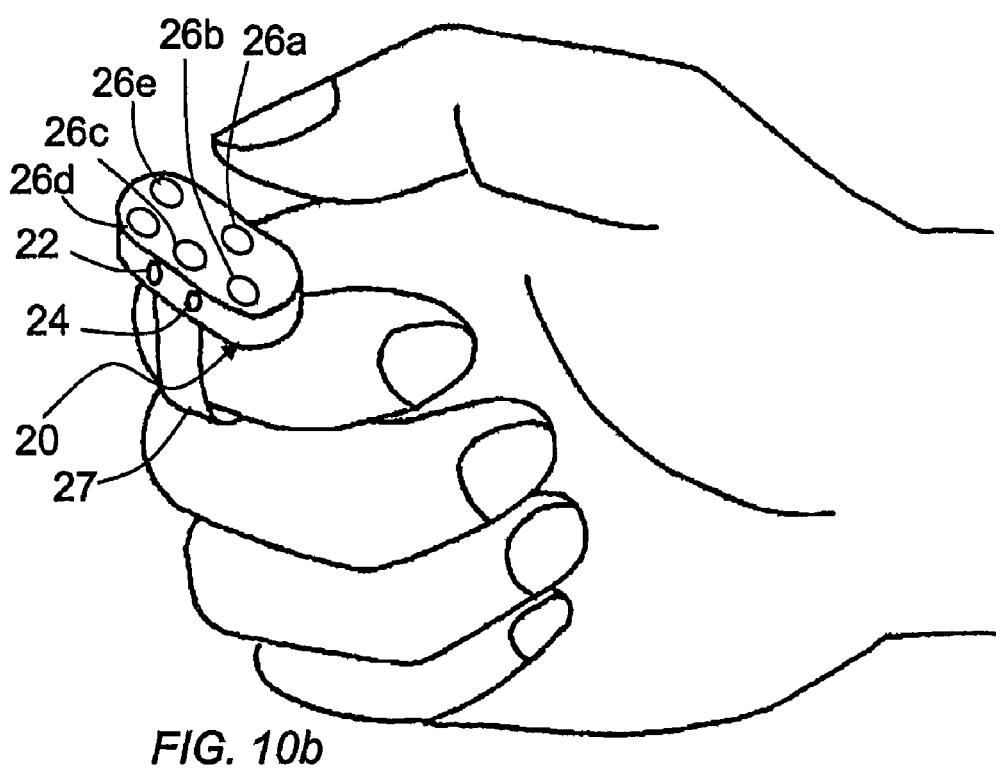
FIG. 10b shows a miniaturized design of the housing unit of the portable free-space data input device with a different button arrangement.

Two alternative designs of the housing unit of portable free-space data input device 20 with a different button arrangement are shown in FIG. 10. Since button 26b is close to button 26c, the amount of movement of the user's thumb may be reduced when both the left mouse button and the right mouse button need to be frequently clicked. Similarly, button 26d is close to button 26e and this makes it easier to operate scroll-up and scroll-down buttons. Similar to the design shown in FIG. 9b, the miniaturized design shown in FIG. 10b allows the user to fasten portable free-space data input device 20 on his/her index finger.

Figure 11:
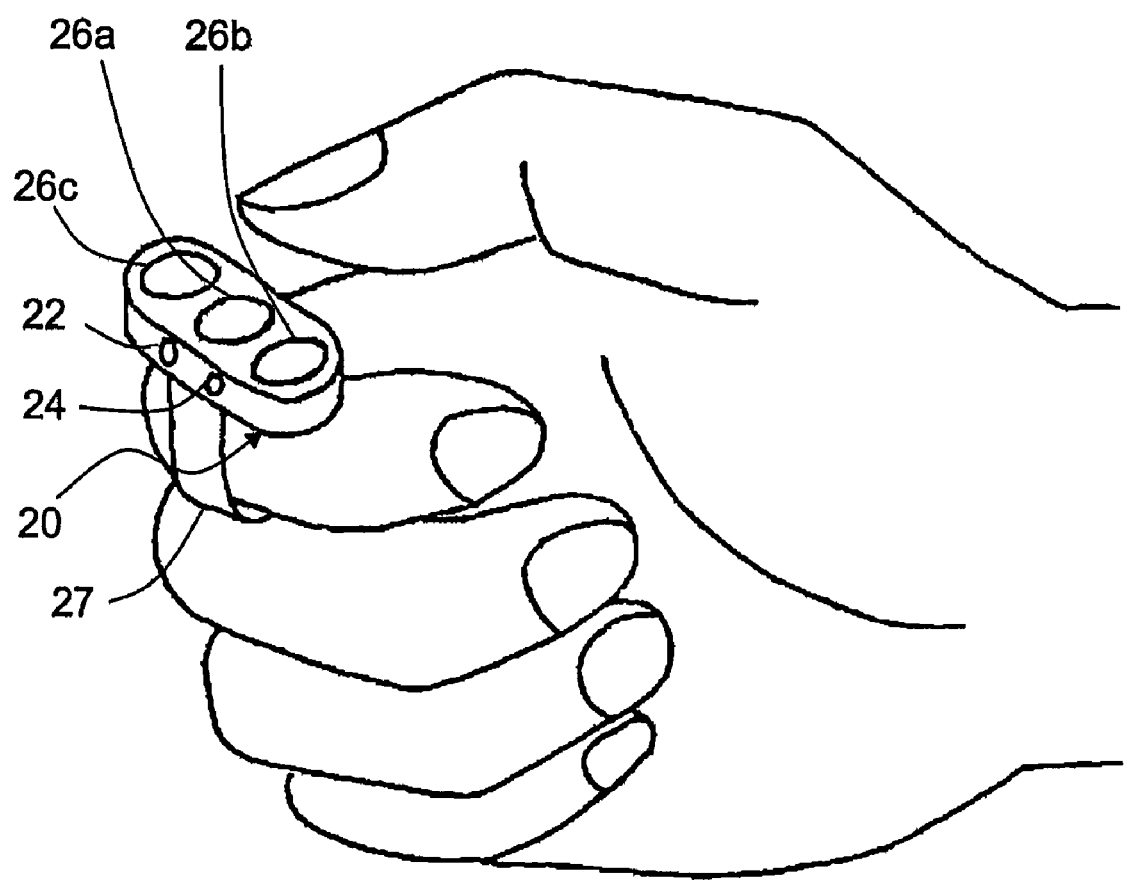
FIG. 11 shows a miniaturized design of the housing unit of the portable free-space data input device with three buttons.

A miniaturized design of the housing unit of portable free-space data input device 20 with three buttons is shown in FIG. 11. This alternative is designed for those people who prefer large buttons. Since an index finger cannot support a large portable free-space data input device, it is difficult to design a compact portable free-space data input device with five large buttons. Therefore, only three buttons 26a, 26b and 26c are designed. With only three buttons, the scroll-up and scroll-down operations can still be implemented by using button 26a to perform a mode control functionality in addition to its usual cursor movement functionality. There are two operation modes: cursor mode and scroll mode. In cursor mode, buttons 26b and 26c are used to implement the functionalities of the left button and the right button of a computer mouse, respectively. In scroll mode, buttons 26b and 26c are used to implement scroll-up and scroll-down operations of a computer mouse, respectively. When button 26a is pressed, the cursor on the computer screen follows the movement of portable free-space data input device 20 as usual. When button 26a is double-clicked, i.e., clicked twice quickly, the operation mode is switched from the present mode to the other mode.

Figure 12:
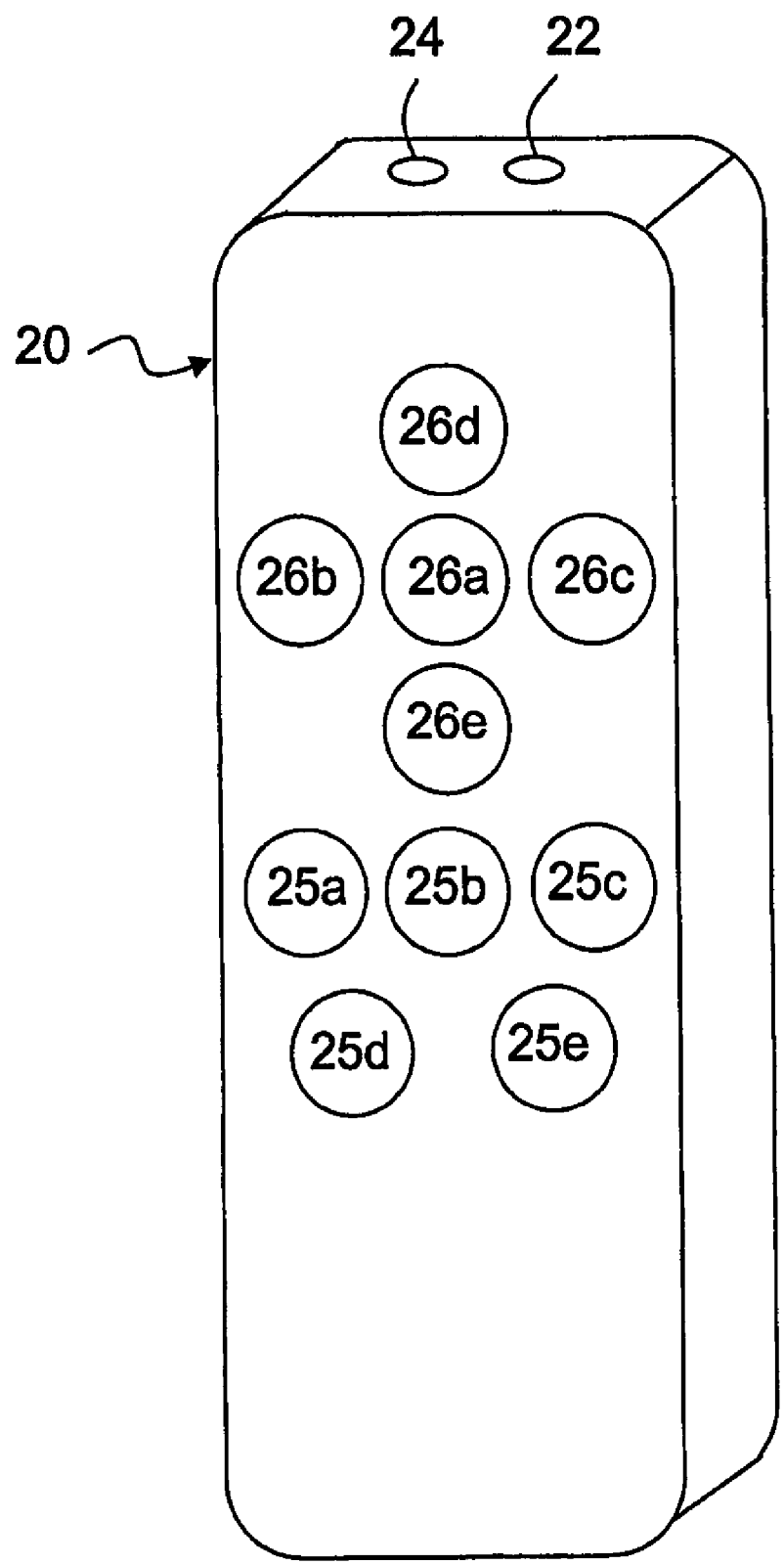
FIG. 12 shows a design of the housing unit of the portable free-space data input device for a multimedia home entertainment system.

A design of the housing unit of portable free-space data input device 20 for a multimedia home entertainment system is shown in FIG. 12. Buttons 25a, 25b, 25c and 25d are mode control buttons. The functionalities of buttons 26a, 26b, 26c, 26d and 26e depend on the operation modes of portable free-space data input device 20. This design can be used as a remote control for a multimedia home entertainment system. Multimedia home entertainment systems combine computers with audio and video equipment and allow users to control various functionalities, such as selecting TV channels, playing and recording video, playing and recording music, showing digital photos and accessing internet, by using a remote control. One desirable functionality of such a remote control is the functionality of controlling cursor movement. The present invention can fulfill the requirements of a multimedia home entertainment system. Five operation modes, i.e., pointing mode, television mode, audio mode, video mode and radio mode can be entered by clicking buttons 25a, 25b, 25c, 25d and 25e, respectively.

When button 25a is clicked, portable free-space data input device 20 enters pointing mode. In pointing mode, the user can use button 26a to control the cursor movement and buttons 26b and 26c to perform the functionalities of the left button and right button of a computer mouse. Buttons 26d and 26e are used to perform scroll-up and scroll-down functionalities. Various personal computer applications, e.g., internet accessing, can be started in this mode. Parameter setting and default setting of the multimedia home entertainment system can also be performed in this mode.

When button 25b is clicked, portable free-space data input device 20 enters television mode. Buttons 26a, 26b, 26c, 26d and 26e can be assigned to perform functionalities required for television channel selection and volume control. Free-space handwriting can be used for entering television channel numbers or television channel names. For example, button 26a can be used to activate the free-space handwriting. The functionalities of audio mode, video mode and radio mode can be similarly designed to control CD, DVD and radio. The other possible audio and video multimedia home entertainment activities such as computer games and karaoke may use a graphical user interface in pointing mode to control their functionalities. The present invention can be incorporated in different designs for a remote control of a multimedia home entertainment system. For example, other buttons for controlling various functionalities for a multimedia home entertainment system and light emitting diodes, which show mode status of the remote control, can be added to the design shown in FIG. 12.

In the preferred embodiment, two perpendicularly oriented slits and two one-dimensional imaging sensors are used on optical position detecting device. Alternative embodiments may use a single one-dimensional imaging sensor and various light limiting means (masks) such as two slits arranged in a V-shaped configuration, a triangular aperture, a triangular light obstructing member with two mutually inclined edges as in U.S. Pat. No. 4,092,072. Another alternative embodiment may use two perpendicularly oriented slits, a single one-dimensional imaging sensor and a ray rotating unit, for instance as a set of prisms, for rotating the sheet of light passing through one slit as in U.S. Pat. No. 4,209,254. In the alternative embodiments mentioned above and the preferred embodiment, if slits are the light limiting means, cylindrical lenses can be used in place of the slits as limiting units to focus the light to the one-dimensional imaging sensors. Optical filters can be used in front of slits or cylindrical lenses to block the undesired frequency bands.

As mentioned before, if the light from the single point of light source is limited by the light limiting means such that a two-dimensional pattern is projected onto the plane(s) where the sensing elements of one-dimensional imaging sensors are located and the pattern is produced by the light limiting means in such a way that the position changes of a single point of light source in at least two dimensions result in two-dimensional changes of the pattern, one or two one-dimensional imaging sensors can be used to capture the two-dimensional pattern changes on the plane(s) and an optical position detecting device based on one-dimensional imaging sensor(s) can be designed. Beside the masks discussed above, it is also possible to use various optical elements such as lenses to produce a two-dimensional pattern. As mentioned before, cylindrical lenses can be used in place of the slits as limiting units to focus the light to the one-dimensional imaging sensors. These cylindrical lenses have a constant focal length. If a cylindrical lens with a continuously varying focal length (e.g., an increasing focal length) along the dimension of the long side of the lens is designed, this lens can be used to produce a two-dimensional pattern on the plane where the sensing elements of a one-dimensional imaging sensor are located. The cylindrical lens with varying focal length is then preferably oriented perpendicularly to the one-dimensional sensor. Therefore, an alternative embodiment of the present invention can be designed based on such a cylindrical lens with a varying focal length and a one-dimensional imaging sensor.

It has been mentioned that depth (range) data can be obtained by extending the present invention by adding one horizontally mounted one-dimensional imaging sensor to the right of one-dimensional imaging sensor 36b and one vertical slit to the right of slit 34b in FIG. 2. The position data of the pulses detected on the two horizontally-mounted one-dimensional imaging sensors (sensor 36a and the newly added sensor) can be used to compute depth (range) data by triangulation. This method of adding an extra one-dimensional imaging sensor and an extra light limiting means can also be used to extend the alternative embodiments of two-dimensional position detection mentioned above to obtain the position in the third dimension by using the triangulation technique.

In the preferred embodiment, commands and synchronization signals are modulated and transmitted via infrared emitting diode 24. Infrared detector 32 receives and demodulates the modulated infrared light pulses. An alternative embodiment may use a short-range radio transmitter on portable free-space data input device 20 to transmit commands and synchronization signals and a radio receiver on optical position detecting device 30 to receive the transmitted radio signal.

In the preferred embodiment, commands and synchronization signals are transmitted wirelessly. An alternative embodiment may use a cable to connect portable free-space data input device 20 and optical position detecting device 30. Electrical pulses for commands and synchronization signals are transmitted from portable free-space data input device 20 to optical position detecting device 30. Battery is not needed for portable free-space data input device 20 of this alternative embodiment since power can be supplied via the cable.

In the preferred embodiment, light emitting diode 22 on portable free-space data input device 20 is used for transmitting pulses for position detection. Infrared emitting diode 24 is used for transmitting commands and synchronization signals. An alternative embodiment may use a single infrared emitting diode to transmit both the modulated pulses for commands and synchronization signals and the pulses for position detection. Infrared one-dimensional imaging sensors should be used on optical position detecting device 30.

In the preferred embodiment, light emitting diode 22 is mounted on portable free-space data input device 20. An alternative embodiment may use an infrared emitting diode to transmit pulses for position detection. This infrared emitting diode can be placed beside optical position detecting device 30 and it is oriented towards the user such that portable free-space data input device 20 is illuminated by the infrared emitting diode. On portable free-space data input device 20, there is a piece of reflective material which reflects infrared light to optical position detecting device 30. The infrared emitting diode is controlled by optical position detecting device 30 and is synchronized to the pulses for commands and synchronization signals transmitted from portable free-space data input device 20.

An alternative way to obtain an ambient light image is to compute a pixel-wise average (or a pixel-wise maximum) of the images captured with the light source switched off before and after capturing an image during the LED-on time period. The pixel-wise subtraction is then performed on the resultant ambient light image and the LED-illuminated image captured. After the data processing of the ambient light removal technique, pulses can be easily detected.

Although the present invention has been described in connection with specific embodiments, it is not intended to be limited to the specific form set forth herein. Rather, the scope of the present invention is limited only by the accompanying claims. In the claims, the term comprising does not exclude the presence of other elements. Additionally although individual features may be included in different claims, these may possibly be advantageously combined and the inclusion in different claims does not imply that a combination of features is not feasible and/or advantageous. In addition singular references do not exclude a plurality. Thus references to "a", "an", "first", "second" etc. do not preclude a plurality. Reference signs in the claims are provided merely as a clarifying example and shall not be construed as limiting the scope of the claims in any way.

The invention claimed is:

1. Method of determining the position of a portable free-space data input device comprising the steps of: receiving, in an optical position detecting device, a first set of pulses from the portable free-space data input device comprising at least one pulse including data to be processed, receiving, in said optical position detecting device, a second set of pulses in the form of light pulses from the portable free-space data input device comprising at least one position indication pulse, limiting a pulse of the second set of pulses to at least one first bundle of rays of light having a certain first cross-sectional shape, projecting said at least one bundle onto a plane, where at least a first one-dimensional detector array is provided, for creating a pattern of light and dark areas in said plane, detecting, in each detector array, a part of the pattern projected on it, and determining the position of the portable free-space data input device in at least two dimensions based on junctions between light and dark areas of parts of the pattern detected by each detector array in order to allow the use of said position together with said input data, and wherein said first set of pulses comprises at least one start pulse indicating start of data to be processed and at least one end pulse indicating an end of data to be processed and further comprising the steps of activating all detector arrays when said start pulse is received and deactivating all detector arrays when said end pulse is received.

2. Method according to claim 1, further comprising the steps of transmitting said first set of pulses from the portable free-space data input device to the optical position detecting device and transmitting said second set of pulses for reception in the optical position detecting device.

3. Method according to claim 2, wherein the step of transmitting said second set of light pulses comprises transmitting said second set of pulses from the portable free-space data input device to the optical position detecting device.

4. Method according to claim 1, further comprising the step of detecting ambient light in each detector array before and/or after detecting a position indication pulse and further comprising the step of subtracting, for each detector array, the previously and/or afterwards detected ambient light from detected light including the pulse in order to safely detect said pulse.

5. Method according to claim 4, wherein ambient light is detected before and after detection of a position indication pulse and further comprising the step of combining the ambient light detected before and after detecting a position indication pulse and using said combined detected ambient light in said step of subtracting.

6. Method according to claim 4, wherein the first set of pulses includes at least one synchronization pulse indicating when the second set of pulses are transmitted and further comprising the step of controlling the detection of ambient light and light including a position indication pulse based on said synchronization pulse.

7. Method according to claim 6, further comprising the step of timing the transmission of the second set of light pulses according to said at least one synchronization pulse.

8. Method according to claim 1, wherein the position of junctions along the length of said first one-dimensional detector is used for determining the position in at least a first dimension.

9. Method according to claim 8, wherein the distance between two detected junctions is used for determining the position in a second dimension.

10. Method according to claim 8, wherein said first shape is rectangular, the long sides of which are perpendicular to said first detector array when projected thereon and further comprising the step of limiting said pulse of the second set of pulses to a second bundle of rays of light having a second cross-sectional shape corresponding to the rotation of the first shape by 90 degrees, projecting said second bundle onto said plane, for creating said pattern, where the position of junctions associated with said second bundle along the length of a one-dimensional detector array is used for determining the position in a second dimension.

11. Method according to claim 10, further comprising the step of rotating the second bundle of rays of light by 90 degrees before projecting it on said plane.

12. Method according to claim 10, wherein said plane comprises a second one-dimensional detector array provided with an orientation perpendicular to said first array, and said second bundle is projected on said second detector array.

13. Method according to claim 1, wherein said plane comprises a third one-dimensional detector array provided with an orientation that is the same as one other detector array and further comprising the step of limiting said second set of light pulses to a third bundle of rays of light having a certain cross-sectional shape and projecting said third bundle onto said plane, for creating said pattern, where the position of junctions associated with said third bundle along the length of the third one-dimensional detector array is used for determining the position in a third dimension perpendicular to both the first and second dimension based on the part of the pattern detected by the third detector array and the part of the pattern detected by said other detector array having the same orientation, for instance using triangulation.

14. Method according to claim 1, further comprising the step of determining the intensity of at least one detected position indication pulse in the second set and the step of determining the position comprises determining the position of the portable free-space device in a third dimension perpendicular to both the first and second dimension based on said intensity.

15. Method according to claim 1, wherein the transmission of the first set of pulses has triggered the transmission of the second set of pulses.

16. Method of enabling an optical position detecting device to determine the position of a portable free-space data input device comprising the steps of: receiving, in the portable free-space data input device, data input by a user of the device, transmitting a first set of pulses from the portable free-space data input device to the optical position detecting device comprising at least one pulse including said data to be processed, and transmitting or reflecting a second set of pulses in the form of light pulses from the portable free-space data input device to the optical position detecting device comprising at least one position indication pulse, in order to allow the optical position detecting device to determine, for use together with said input data, the position of the portable free-space data input device in at least two dimensions based on detecting junctions between light and dark areas of parts of a pattern of light and dark areas in at least a first one-dimensional detector array provided in a plane, where a pulse of the second set of pulses has been limited to at least one first bundle of rays of light having a certain first cross-sectional shape and projected onto said plane for creating said pattern, wherein said first set of pulses comprises at least one start pulse indicating start of data to be processed and at least one end pulse indicating an end of data to be processed for allowing the optical position detecting device to activate all detector arrays when said start pulse is received and deactivate all detector arrays when said end pulse is received.

17. Method according to claim 16, wherein the transmission of the first set of pulses triggers the transmission of the second set of pulses.

18. Method according to claim 17, wherein the first set of pulses includes at least one synchronization pulse indicating when the second set of pulses are to be transmitted and further comprising the step of timing the transmission of the second set of light pulses according to said at least one synchronization pulse.

19. Optical position detecting device comprising a data receiving unit arranged to receive a first set of pulses from a portable free-space data input device comprising at least one pulse including data to be processed, a first limiting unit for receiving a second set of pulses in the form of light pulses, limiting a pulse of this second set to at least one first bundle of rays of light having a certain first cross-sectional shape and projecting said at least one bundle onto a plane for creating a pattern of light and dark areas in said plane, at least a first one-dimensional detector array in said plane, where each detector array is arranged to detect a part of the pattern projected on it, an image capturing unit controlling the operation of detector arrays, and a pulse detecting unit arranged to determine the position of the portable free-space data input device in at least two dimensions based on junctions between light and dark areas of parts of the pattern detected by each detector array in order to allow the use of said position together with said input data,
wherein said first set of pulses comprises at least one start pulse indicating start of data to be processed and at least one end pulse indicating an end of data to be processed, which the data receiving unit is arranged to forward to the image capturing unit, the image capturing unit being further arranged to activate all detector arrays when said start pulse is received and deactivate all detector arrays when said end pulse is received.

20. Optical position detecting device according to claim 19, wherein the first limiting unit is an opening shaped for providing said first cross-sectional shape.

21. Optical position detecting device according to claim 19, wherein the first limiting unit is a first lens shaped for focusing said first bundle of rays with said first cross-sectional shape.

22. Optical position detecting device according to claim 19, wherein the image capturing unit is arranged to control each detector array to detect ambient light before and/or after detecting a position indication pulse and further comprising an image processing unit arranged to subtract, for each detector array, the previously and/or afterwards detected ambient light from detected light including the position indication pulse in order to safely detect said pulse.

23. Optical position detecting device according to claim 22, wherein the image capturing unit is arranged to control each detector array to detect ambient light before and after detection of a position indication pulse and the image processing unit is further arranged to combine the ambient light detected before and after detecting a position indication pulse and using said combined detected ambient light in said subtracting.

24. Optical position detecting device according to claim 22, wherein the first set of pulses includes at least one synchronization pulse indicating when the second set of pulses is transmitted, which the data receiving unit is arranged to forward to the image capturing unit, and the image capturing unit is further arranged to control the detection of ambient light and light including a position indication pulse by each one-dimensional detector array based on said synchronization pulse.

25. Optical position detecting device according to claim 19, wherein the pulse detection unit is arranged to use the position of junctions along the length of said first one-dimensional detector for determining the position in at least a first dimension.

26. Optical position detecting device according to claim 25, wherein the pulse detection unit is arranged to use the distance between two detected junctions for determining the position in a second dimension.

27. Optical position detecting device according to claim 26, wherein said first shape is rectangular, the long sides of which are perpendicular to said first detector array when projected thereon and further comprising a second limiting unit for receiving said second set of pulses, limiting said pulse of the second set of pulses to a second bundle of rays of light having a second cross-sectional shape corresponding to the rotation of the first shape by 90 degrees, and projecting said second bundle onto said plane, for creating said pattern, where the pulse detection unit (38c) is arranged to use the position of junctions associated with said second bundle along the length of a one-dimensional detector array for determining the position in a second dimension.

28. Optical position detecting device according to claim 27, further comprising a ray rotating unit arranged to rotate said second bundle of rays of light by 90 degrees before projecting on said plane.

29. Optical position detecting device according to claim 27, further comprising a second one-dimensional detector array provided with an orientation perpendicular to said first array in said plane, wherein said second bundle is projected on said second detector array.

30. Optical position detecting device according to claim 19, further comprising a third one-dimensional detector array provided in said plane having an orientation that is the same as one other detector array and further comprising a third limiting unit for receiving said second set of pulses, limiting said pulse of the second set of pulses to a third bundle of rays of light having a certain cross-sectional shape and projecting said third bundle onto said plane, for creating said pattern, where the pulse detection unit is arranged to use the position of junctions associated with said third bundle along the length of the third one-dimensional detector array for determining the position in a third dimension perpendicular to both the first and second dimension based on the part of the pattern detected by the third detector array and the part of the pattern detected by said other detector array, for instance using triangulation.

31. Optical position detecting device according to claim 19, wherein the image processing unit is further arranged to determine the intensity of at least one detected position indication pulse in the second set for allowing the pulse detection unit to determine the position of the portable free-space device in a third dimension perpendicular to both the first and second dimension based on said intensity.

32. Optical position detecting device according to claim 19, further comprising a light source arranged to emit said second set of pulses to be reflected on a reflective material provided on the portable free-space data input device.

33. Optical position detecting device according to claim 19, wherein the transmission of the first set of pulses has triggered the transmission of the second set of pulses.

34. Portable free-space data input device comprising: a user input unit arranged to receive data input by a user of the device, means for transmitting a first set of pulses to an optical position detecting device comprising at least one pulse including said data to be processed, and means for transmitting or reflecting a second set of pulses in the form of light pulses to the optical position detecting device comprising at least one position indication pulse, and a transmission control unit receiving said input data from the user input unit and controlling at least said means for transmitting said first set of pulses, in order to allow the optical position detecting device to determine, for use in combination with said input data, the position of the portable free-space data input device in at least two dimensions based on detecting junctions between light and dark areas of parts of a pattern of light and dark areas in at least a first one-dimensional detector array provided in a plane, where a pulse of the second set of pulses has been limited to at least one first bundle of rays of light having a certain first cross-sectional shape and projected onto said plane for creating said pattern, and wherein said first set of pulses comprises at least one start pulse indicating start of data to be processed and at least one end pulse indicating an end of data to be processed for allowing the optical position detecting device to activate all detector arrays when said start pulse is received and deactivate all detector arrays when said end pulse is received.

35. Portable free-space data input device according to claim 34, wherein said means for transmitting a first set of pulses and means for transmitting or reflecting a second set of pulses are provided in the same unit that transmits light pulses.

36. Portable free-space data input device according to claim 34, wherein the transmission of the first set of pulses triggers the transmission of the second set of pulses.

37. Portable free-space data input device according to claim 36, wherein the transmission control unit is further arranged to provide at least one synchronization pulse in the first set of pulses to be sent by said means for transmitting a first set of pulses, and to control the timing of the transmission of the second set of light pulses to said at least one synchronization pulse.

38. System for determining the position of a portable free-space data input device comprising: a portable free-space data input device having a user input unit arranged to receive data input by a user of the device, means for transmitting a first set of pulses comprising at least one pulse including said data to be processed, and means for transmitting or reflecting a second set of pulses in the form of light pulses comprising at least one position indication pulse, and a transmission control unit receiving said input data from the user input unit and controlling at least said means for transmitting said first set of pulses, an optical position detecting device having a data receiving unit arranged to receive said first set of pulses, a first limiting unit for receiving said second set of pulses, limiting a pulse of this second set to at least one first bundle of rays of light having a certain first cross-sectional shape and projecting said at least one bundle onto a plane for creating a pattern of light and dark areas in said plane, at least a first one-dimensional detector array in said plane, where each detector array is arranged to detect a part of the pattern projected on it, an image capturing unit controlling the operation of detector arrays, and a pulse detecting unit arranged to determine the position of the portable free-space data input device in at least two dimensions based on junctions between light and dark areas of parts of the pattern detected by each detector array in order to allow the use of said position together with said input data, and
　　wherein said first set of pulses comprises at least one start pulse indicating start of data to be processed and at least one end pulse indicating an end of data to be processed for allowing the optical position detecting device to activate all detector arrays when said start pulse is received and deactivate all detector arrays when said end pulse is received.

* * * * *